US012267150B2

(12) United States Patent
Mondal et al.

(10) Patent No.: US 12,267,150 B2
(45) Date of Patent: Apr. 1, 2025

(54) BROADCAST POSITIONING SYSTEM SUPPORTING LOCATION SERVICES THROUGH OVER-THE-AIR TELEVISION (TV) SIGNALS

(71) Applicant: National Association of Broadcasters, Washington, DC (US)

(72) Inventors: Tariq Islam Mondal, Germantown, MD (US); Robert Samuel Matheny, Jr., Beaufort, NC (US); Robert Douglas Weller, Washington, DC (US)

(73) Assignee: National Association of Broadcasters, Washington, DC (US)

( * ) Notice: Subject to any disclaimer, the term of this patent is extended or adjusted under 35 U.S.C. 154(b) by 582 days.

(21) Appl. No.: 17/590,101

(22) Filed: Feb. 1, 2022

(65) Prior Publication Data

US 2022/0345235 A1 Oct. 27, 2022

Related U.S. Application Data

(60) Provisional application No. 63/242,618, filed on Sep. 10, 2021, provisional application No. 63/180,345, filed on Apr. 27, 2021.

(51) Int. Cl.
*H04H 60/51* (2008.01)
*H04H 40/18* (2008.01)

(52) U.S. Cl.
CPC ............ *H04H 60/51* (2013.01); *H04H 40/18* (2013.01)

(58) Field of Classification Search
CPC ............................... H04H 60/51; H04H 40/18
See application file for complete search history.

(56) References Cited

U.S. PATENT DOCUMENTS 11,290,200 B2 * 3/2022 Michael ................ H04J 3/0667
2016/0182189 A1 * 6/2016 Stadali .................. H04L 1/0009 370/474

(Continued)

OTHER PUBLICATIONS

Author Unknown, "Longley-Rice Methodology for Evaluation TV Coverage and Interface," OET Bulletin No. 69, Feb. 6, 2004, Federal Communications Commission, 15 pages.

(Continued)

*Primary Examiner* — Junpeng Chen
(74) *Attorney, Agent, or Firm* — Withrow & Terranova, PLLC

(57) ABSTRACT

Broadcast positioning systems supporting location services through over-the-air broadcast television (TV) signals are disclosed. The broadcast positioning system supports a broadcast TV signal format that includes a transmission time of the broadcast TV. The transmission time of the broadcast TV signal is used by a TV signal receiver to determine the propagation delay of the broadcast TV signal between the TV signal transmitter and the TV signal receiver. The TV signal receiver is also configured to receive multiple broadcast TV signals from multiple TV broadcasters, wherein the same delay of arrival for those broadcast TV signals can be determined. In this manner, the TV signal receiver can use the determined multiple delays of arrival from the multiple received broadcast TV signals as time-of-arrival (TOA) and the known locations of the antenna radiating these multiple broadcast TV signals to perform a trilateration or multilateration calculation to determine its position.

38 Claims, 18 Drawing Sheets

(56) References Cited

U.S. PATENT DOCUMENTS

| | | | | |
|---|---|---|---|---|
| 2016/0191158 | A1* | 6/2016 | Aoyama | H04B 10/54 398/172 |
| 2016/0359603 | A1* | 12/2016 | Fay | H04N 21/2362 |
| 2019/0123947 | A1* | 4/2019 | Atungsiri | H04L 27/2613 |

OTHER PUBLICATIONS

Author Unknown, "Physical Layer Protocol," ATSC Standard A/322, Jan. 20, 2021, Advanced Television Systems Committee, Washington, D.C, 263 pages.
Author Unknown, "Scheduler / Studio to Transmitter Link," ATSC Standard A/324, Mar. 24, 2021, Advanced Television Systems Committee, Washington, D.C., 128 pages.
Author Unknown, "Signaling, Delivery, Synchronization, and Error Protection," ATSC Standard A/331, Jan. 16, 2020, Advanced Television Systems Committee, Washington, D.C., 231 pages.
Author Unknown, "Guidelines for the Physical Layer Protocol," ATSC Recommended Practice A/327, Jan. 25, 2021, Advanced Television Systems Committee, Washington, D.C., 137 pages.
Author Unknown, "System Discovery and Signaling," ATSC Standard A/321, Mar. 23, 2016, Advanced Television Systems Committee, Washington, D.C., 28 pages.
Author Unknown, "The ILLR Computer Program for Predicting Digital Television Signal Strengths at Individual Locations," OET Bulletin No. 73, Nov. 23, 2010, Federal Communications Commission, 9 pages.
Author Unknown, "World Geodetic System—1984," WGS-84 Manual, Second Edition, 2002, International Civil Aviation Organization, 138 pages.
Alakananda, et al., "Evaluation of Two Site-Specific Radio Propagation Models," International Symposium on Advanced Radio Technologies, NTIA Special Publication SP-03-401, Mar. 2003, pp. 89-96.
Ericksen, et al., "Distance and Bearing Calculations," NAB Engineering Handbook, 11th Edition, 2018, pp. 53-57.
Kaplan, et al., "Understanding GPS/GNSS: Principles and Applications," Third Edition, 2017, Artech House, 994 pages.
Misra, et al., "Global Positioning System: Signals, Measurements, and Performance," Second Edition, 2006, Lincoln, Massachusettes, Ganga-Jamuna Press, 295 pages.
Mondal, Tariq, "Enhancing GPS Location Accuracy with ATSC 3.0," Blog Post, Sep. 2, 2020, National Association of Broadcasters, 6 pages.
Stein, Seymour, "Algorithms for Ambiguity Function Processing," IEEE Transactions on Acoustics, Speech, and Signal Processing, vol. ASSP-29, Issue 3, Jun. 1981, pp. 588-599.
Torrieri, Don, "Statistical Theory of Passive Location Systems," IEEE Transactions on Aerospace and Electronic Systems, vol. AES-20, Issue 2, Mar. 1984, pp. 183-198.

* cited by examiner

500

L1-BASIC SIGNALING FIELDS AND SYNTAX

| SYNTAX | NO. OF BITS | FORMAT |
|---|---|---|
| L1_BASIC_SIGNALING() { | | |
| L1B_VERSION | 3 | UIMSBF |
| L1B_MIMO_SCATTERED_PILOT_ENCODING | 1 | UIMSBF |
| L1B_LLS_FLAG | 1 | UIMSBF |
| L1B_TIME_INFO_FLAG | 2 | UIMSBF |

FIG. 5A

502

| SYNTAX | NO. OF BITS | FORMAT |
|---|---|---|
| L1_Detail_signaling() { | | |
| L1D_version | 4 | uimsbf |
| L1D_num_rf | 3 | uimsbf |
| for (L1D_rf_id=1 .. L1D_num_rf) { | | |
| L1D_bonded_bsid | 16 | uimsbf |
| reserved | 3 | bslbf |
| } | | |
| if (L1B_time_info_flag != 00) { | | |
| L1D_time_sec | | |
| L1D_time_msec | 32 | uimsbf |
| if (L1B_time_info_flag != 01) { | 10 | uimsbf |
| L1D_time_usec | | |
| if (L1B_time_info_flag != 10) { | 10 | uimsbf |
| L1D_time_nsec | | |
| } | 10 | uimsbf |
| } | | |
| } | | |

FIG. 5B $$t_m = t_g + \tau_d + \tau_a + \tau_p$$

$$\tau = \tau_d + \tau_a = t_m - t_g - \tau_p$$

$$\text{WHERE } \tau_p = \frac{\sqrt{(x_1-x_2)^2+(y_1-y_2)^2+(z_1-z_2)^2}}{C}$$

1100

$$\sqrt{(X_2-X)^2+(Y_2-Y)^2+(Z_2-Z)^2} - \sqrt{(X_1-X)^2+(Y_1-Y)^2+(Z_1-Z)^2} = c[(t_2{}'-t_1{}')-(t_2-t_1)]$$

$$\sqrt{(X_3-X)^2+(Y_3-Y)^2+(Z_3-Z)^2} - \sqrt{(X_1-X)^2+(Y_1-Y)^2+(Z_1-Z)^2} = c[(t_3{}'-t_1{}')-(t_3-t_1)]$$

$$\vdots$$

$$\sqrt{(X_n-X)^2+(Y_n-Y)^2+(Z_n-Z)^2} - \sqrt{(X_1-X)^2+(Y_1-Y)^2+(Z_1-Z)^2} = c[(t_n{}'-t_1{}')-(t_n-t_1)]$$

FIG. 11

BROADCAST POSITIONING SYSTEM SUPPORTING LOCATION SERVICES THROUGH OVER-THE-AIR TELEVISION (TV) SIGNALS

RELATED APPLICATIONS

The present application claims priority to U.S. Provisional Patent Application Ser. No. 63/180,345, filed Apr. 27, 2021, and U.S. Provisional Patent Application Ser. No. 63/242,618, filed Sep. 10, 2021, the disclosures of which are incorporated herein by reference in their entireties.

FIELD OF THE DISCLOSURE

The technology of the disclosure relates to broadcasting (i.e., transmission) and reception of television (TV) signals, and more particularly to supporting location services in TV signal compatible receivers.

BACKGROUND

Television (TV) broadcasters use high-power, high tower, terrestrial antennas to broadcast TV signals. The TV signals are modulated onto a radio frequency carrier and radiated from an antenna as over-the-air signals. The broadcast TV signals can then be received through a reception antenna of a TV signal-compatible receiver device as over-the-air signals. For example, TV broadcasters may broadcast TV signals according to the Advanced Television Systems Committee (ATSC) 3.0 standards. Alternatively, a receiver device may receive the TV signals as re-transmitted signals through a different physical transmission medium, such as a cable network or wired or wireless Internet, as examples. In either case, the TV signals can be decoded and display as visual and audio content by TV signal-compatible display devices or compatible receivers.

Satellite signal transmission is also employed in the global positioning system (GPS) for providing timing and location services. In GPS, a GPS receiver can determine its location through trilateration or multilateration based on receiving multiple satellite signals from known satellites that have known locations. The GPS receiver can calculate its position based on the differences in time-of-arrival (TOA) (and thus relative delay) in signal reception from the multiple satellites determined based on use of synchronized clocks. TV broadcasters have an advantage over satellite transmission systems by being capable of signal transmission in certain situations that may not be available, reliable, or possible for satellite signal transmission. TV broadcast signals can travel long distances and can penetrate obstacles, including man-made structures, that satellite signals cannot or may not. Weather events, such as strong winds, rain, and snow, can interfere with transmitted satellite signals and thus their reception. Moreover, TV transmission facilities are designed to operate during natural disasters. Also, most areas in the United States, for example, are in the broadcast range of multiple TV broadcaster's transmission systems and thus can receive multiple TV broadcast signals from these multiple TV broadcasters. GPS signals can also be spoofed by fake GPS transmitters that can cause a GPS receiver to incorrectly determine its position based on the spoofed GPS signals.

It may be desired for TV signal receivers to determine their position for providing location services without requiring such TV receivers to also include a GPS receiver. Even if a TV signal receiver includes a GPS receiver capable of determining position through received GPS satellite signals, it may also be desired for such TV signal receivers to have a secondary and/or fallback method of determining location without use of GPS satellite signals.

SUMMARY

Exemplary aspects disclosed herein include broadcast positioning systems supporting location services through over-the-air (wireless) television (TV) signals. The broadcast positioning system includes a TV signal transmitter that is capable of transmitting broadcast TV signals through an antenna, including a terrestrial antenna, over-the-air to be received by compatible TV signal receivers. The transmitted TV signals can include TV-based content that is demodulated and processed by a TV signal receiver receiving the broadcast TV signals to be displayed on a visual display. The TV signal receiver can be a mobile device or a non-mobile device. In exemplary aspects disclosed herein, to support the ability of the TV signal receiver to also determine the time and its position and location without the requirement of also including a GPS receiver or other positioning system as examples, the broadcast positioning system supports inclusion of a broadcast TV signal format that includes a transmission time (e.g., a timestamp) that the broadcast TV signal is transmitted. The transmission time of the broadcast TV signal is used by the TV signal receiver to determine the time of arrival, and thus the propagation delay of the broadcast TV signal between the TV signal transmitter and its reception at the TV signal receiver. The broadcast TV signal can also include clock information used by the TV signal receiver to synchronize its clock to the TV broadcaster so that an accurate propagation delay can be calculated based on the timing information included in the received broadcast TV signal. The TV signal receiver is also configured to receive multiple broadcast TV signals from multiple TV broadcasters, wherein the same time delay of arrivals for those broadcast TV signals can be determined. The positions of the antennas of the multiple TV broadcasters that transmitted their respective broadcast TV signals are known and can be programmed to be known by the TV signal receiver. In this manner, the TV signal receiver can use the determined multiple time delays of arrival from the multiple received broadcast TV signals as multiple time-of-arrival (TOA) and the known locations of the antenna radiating these multiple broadcast TV signals to perform a trilateration or multilateration calculation to determine its position to provide location services.

However, note that the transmission time of the broadcast TV signal may be affected by a group delay (e.g., signal processing delay and delay in further downstream signal processing of the broadcast TV signal) that occurs in the TV signal transmitter after generation and insertion of the transmission time into a communication frame. Notably, a group delay refers generally to an actual transit time of a signal through multiple circuits in a device (e.g., a TV signal transmitter) as a function of respective processing frequencies (e.g., clock rate) of the multiple circuits. Specifically, in the context of the present disclosure, the group delay refers to a total delay between a time at which the transmission time is generated and inserted into the communication frame in the broadcast TV signal and a time at which the broadcast TV signal is emitted over-the-air through an antenna in the TV signal transmitter. For example, after a broadcast TV signal is framed and the transmission time is generated and inserted in the communications frame, the framed broadcast TV signal may be converted to a waveform (e.g., in-phase and quadrature (IQ) signals) at a radio frequency (or frequency band) of a broadcaster according to their TV transmission license to be transmitted as a radio-frequency (RF) signal as an over-the-air signal. This conversion incurs a signal processing delay as part of the group delay. As another example, further delay in the transmission of the broadcast TV signal can occur as another part of the group delay when the broadcast TV signal is processed by an RF transmitter circuit to create a transmission-ready RF signal. For example, the broadcast TV signal may be further processed by digital-to-analog converters (DACs), filters, amplifiers, and waveguides before being ultimately transmitted over an antenna. Thus, the group delay may include this additional signal processing delay, which differs from a propagation delay that only occurs after the broadcast TV signal is transmitted through the antenna, if the transmission time is generated before this further signal processing occurs. Thus, in other exemplary aspects disclosed herein, the transmission time can be compensated to account for an estimation of the additional signal processing delay between when the transmission time is generated and the broadcast TV signal is actually transmitted from the antenna. The group delay between when the transmission time is determined and when the broadcast TV signal is ultimately transmitted over-the-air through the antenna is compensated so that the TV signal receiver does not have to determine a propagation delay for the broadcast TV signal that includes the group delay in the TV signal transmitter, which is not truly part of the propagation delay. As another example, the transmission time included in the communication frame can be generated based on an estimate of the signal processing delay when the transmission time is generated and before the additional signal processing of the communication frame is performed to generate the broadcast TV signal.

In this manner, the broadcast positioning system allows the TV signal receiver to provide location services without the requirement to include a GPS receiver or other positioning system. The TV signal broadcaster antenna towers act like satellites in a GPS system that are in known locations and where the propagation delay of its transmitted TV signals can be used by a TV signal receiver to perform a trilateration or multilateration calculation to determine its position. As an alternative, the TV signal receiver can receive clock information from another source to synchronize its clock with the clock of the TV broadcaster. The broadcast positioning system can allow a TV signal receiver to determine its position as a secondary or backup method to other methods, such as through the GPS. For example, the TV signal receiver may be configured to determine location using the broadcast positioning system and also using the GPS through received signals in a GPS receiver. The TV signal receiver can compare the positioning calculations through both systems to determine if a significant enough disagreement between calculated positions exists to note an issue. For example, the position determined by the GPS receiver may have been based on spoofed GPS satellite signals.

In exemplary aspects disclosed herein, the broadcast positioning system and the location services made available through the same TV signal receiver may be provided through a particular TV broadcast signal format that can include delay timing information to determine delay in time of arrival. For example, the TV broadcast signal format may be according to the Advanced Television Systems Committee (ATSC) 3.0 standard as a non-limiting example. The ATSC 3.0 standard specifies delivery of content (i.e., payload) through a broadcast signal according to an ATSC 3.0 communication frame. The ATSC 3.0 communication frame includes a preamble that includes fields that allow inclusion of the transmission time, which can be edited to account for the group delay.

In another exemplary aspect, a TV signal transmitter is provided. The TV signal transmitter includes a frame circuit. The frame circuit is configured to receive communications data and generate a plurality of communication frames. Each of the plurality of communication frames includes a preamble configured to indicate a transmission time of a respective one of the plurality of communication frames. Each of the plurality of communication frames also includes a payload subframe comprising the communications data. The TV transmitter also includes a transmitter circuit. The transmitter circuit is configured to determine a group delay between a time at which the preamble is generated and a time at which the respective one of the plurality of communication frames is transmitted. The transmitter circuit is also configured to update the transmission time in the preamble in each of the plurality of communication frames to include the determined group delay. The transmitter circuit is also configured to generate a broadcast TV signal comprising the plurality of communication frames.

In another exemplary aspect, a method performed by a TV signal transmitter for support broadcast positioning service (BPS) is provided. The method includes generating a plurality of communication frames. Each of the plurality of communication frames includes a preamble configured to indicate a transmission time of a respective one of the plurality of communication frames. Each of the plurality of communication frames also includes a payload subframe comprising a communications data. The method also includes determining a group delay between a time at which the preamble is generated and a time at which the respective one of the plurality of communication frames is transmitted. The method also includes updating the transmission time in the preamble in each of the plurality of communication frames to include the determined group delay. The method also includes generating a broadcast TV signal comprising the plurality of communication frames.

In another exemplary aspect, a TV signal receiver is provided. The TV signal receiver includes a radio-frequency (RF) receiver circuit. The RF receiver circuit is configured to receive a plurality of broadcast TV signals. The TV signal receiver also includes a control circuit. The control circuit is configured to determine a plurality of propagation delays for the received plurality of broadcast TV signals, respectively. The control circuit is also configured to determine a location of the TV signal receiver based on a TDOA of the plurality of broadcast TV signals and the plurality of propagation delays, respectively.

In another exemplary aspect, a method performed by a TV signal receiver for supporting BPS is provided. The method includes receiving a plurality of broadcast TV signals. The method also includes determining a plurality of propagation delays for the received plurality of broadcast TV signals, respectively. The method also includes determining a location of the TV signal receiver based on a TDOA of the plurality of broadcast TV signals and the plurality of propagation delays, respectively.

Those skilled in the art will appreciate the scope of the present disclosure and realize additional aspects thereof after reading the following detailed description of the preferred aspects in association with the accompanying drawing figures.

BRIEF DESCRIPTION OF THE DRAWING FIGURES

The accompanying drawing figures incorporated in and forming a part of this specification illustrate several aspects of the disclosure, and together with the description, serve to explain the principles of the disclosure.

FIG. 1 is a diagram of an exemplary broadcast positioning system that includes a TV signal transmitter configured to include transmission time in a transmitted broadcast TV signal to allow a TV signal receiver to accurately determine the propagation delay of the broadcast TV signal to be used to determine the time differences-of-arrival (TDOA) with other received broadcast TV signals to calculate location;

FIG. 5A is a table illustrating the L1-Basic signaling field and syntax in the L1-Basic field of the preamble of the ATSC 3.0 communication frame in FIG. 4;

FIG. 5B is a table illustrating the L1-Detail signaling field and syntax in the L1-Detail field of the preamble of the ATSC 3.0 communication frame in FIG. 4;

FIG. 11 is a diagram illustrating time differences-of-arrival (TDOA) equations involving broadcast signals to broadcast stations;

Figure 1:
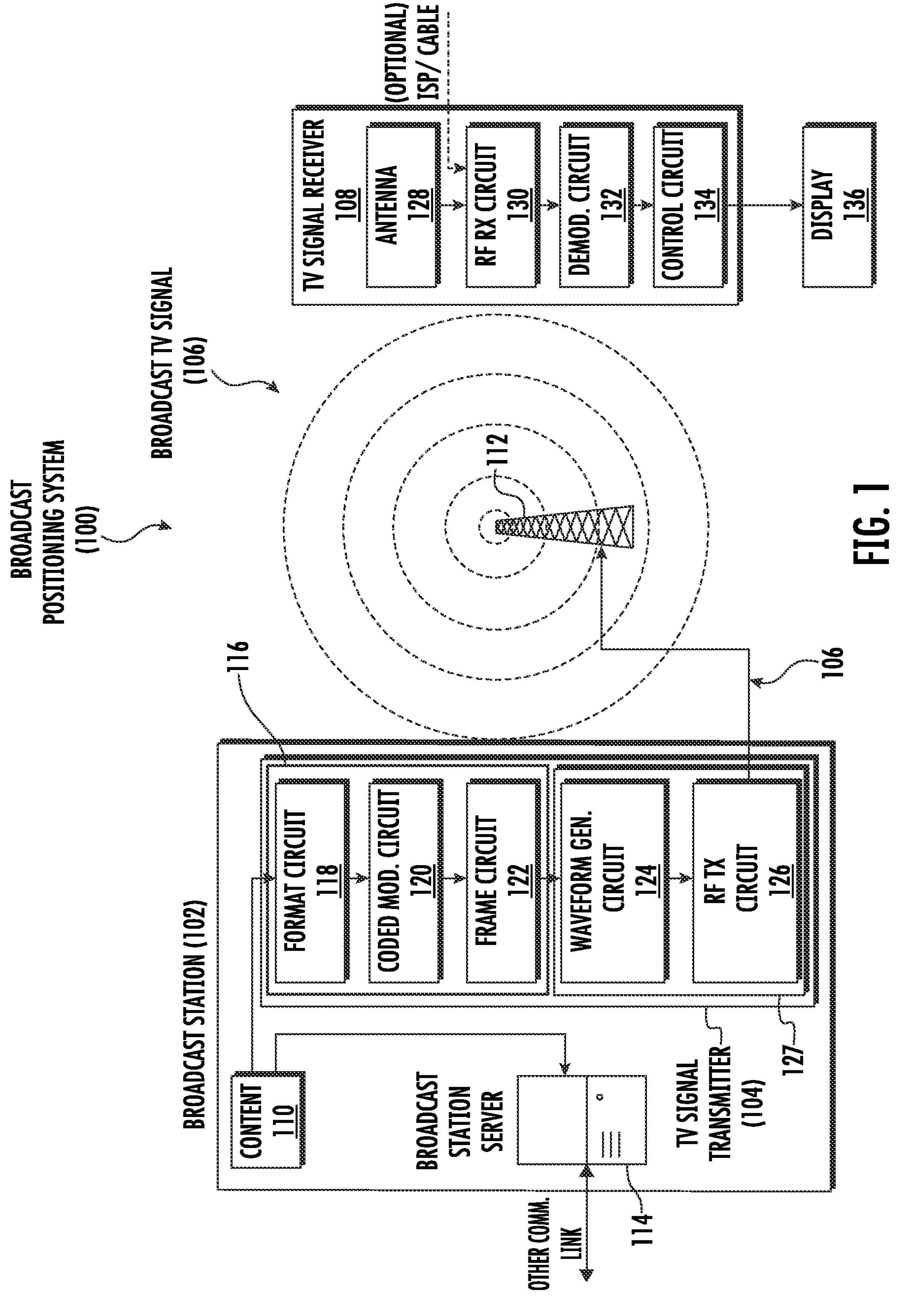
Figure 14:
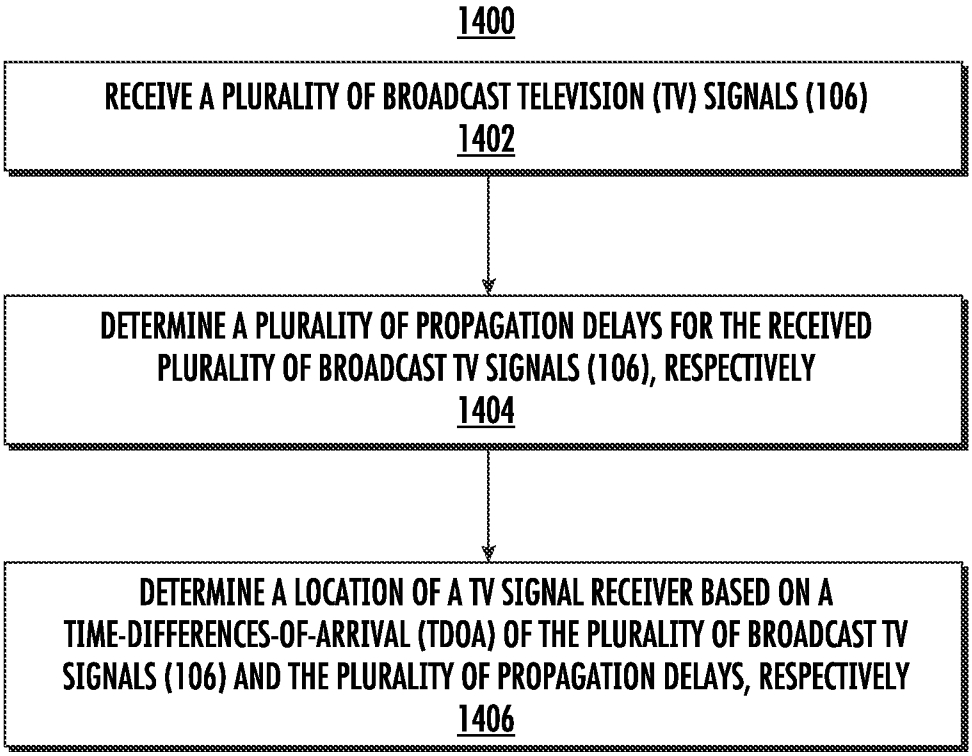
Figure 15:
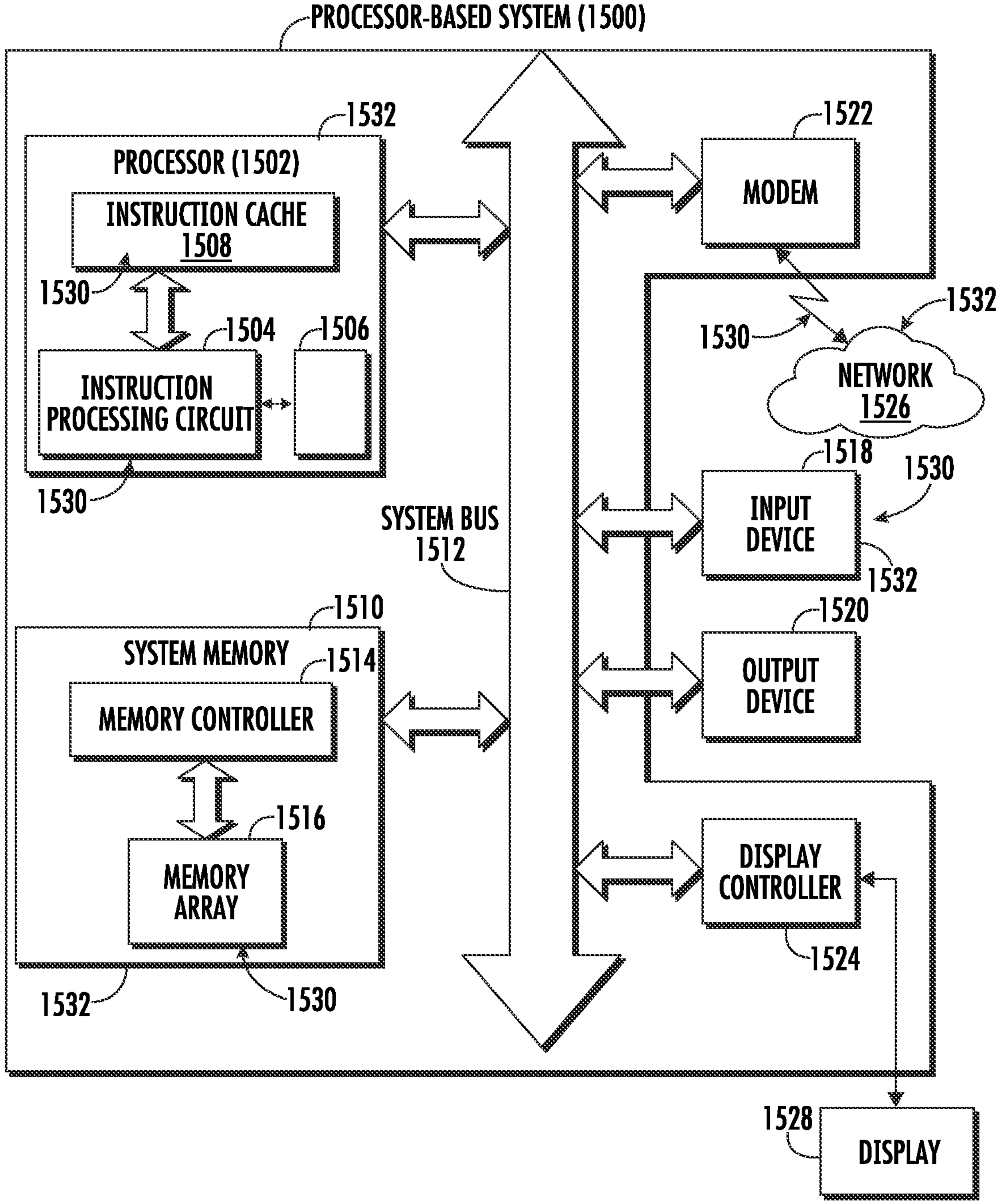

FIG. 14 is a flowchart of an exemplary process that can be performed by the TV signal received in FIG. 1 for supporting the BPS; and FIG. 15 is a block diagram of an exemplary processor-based system that includes a processor that can be included in a TV signal transmitter and/or a TV signal receiver, including those in the broadcast positioning system in FIG. 1 and according to any other embodiments, for respectively generating a transmission time to be included in a transmitted broadcast TV signal to be transmitted, and for receiving and processing the transmission time and/or processing delay information included in a received broadcast TV signal to determine propagation delay of the broadcast TV signal for determining a location of the TV signal receiver.

DETAILED DESCRIPTION

Aspects disclosed herein include broadcast positioning systems supporting location services through over-the-air (wireless) television (TV) signals. The broadcast positioning system includes a TV signal transmitter that is capable of transmitting broadcast TV signals through an antenna, including a terrestrial antenna, over-the-air to be received by compatible TV signal receivers. The transmitted TV signals can include TV-based content that is demodulated and processed by a TV signal receiver receiving the broadcast TV signals to be displayed on a visual display. The TV signal receiver can be a mobile device or a non-mobile device. In exemplary aspects disclosed herein, to support the ability of the TV signal receiver to also determine the time and its position and location without the requirement of also including a GPS receiver or other positioning system as examples, the broadcast positioning system supports inclusion of a broadcast TV signal format that includes a transmission time (e.g., a timestamp) that the broadcast TV signal is transmitted. The transmission time of the broadcast TV signal is used by the TV signal receiver to determine the time of arrival, and thus the propagation delay of the broadcast TV signal between the TV signal transmitter and its reception at the TV signal receiver. The broadcast TV signal can also include clock information used by the TV signal receiver to synchronize its clock to the TV broadcaster so that an accurate propagation delay can be calculated based on the timing information included in the received broadcast TV signal. The TV signal receiver is also configured to receive multiple broadcast TV signals from multiple TV broadcasters, wherein the same time delay of arrivals for those broadcast TV signals can be determined. The positions of the antennas of the multiple TV broadcasters that transmitted their respective broadcast TV signals are known and can be programmed to be known by the TV signal receiver. In this manner, the TV signal receiver can use the determined multiple time delays of arrival from the multiple received broadcast TV signals as multiple time-of-arrival (TOA) and the known locations of the antenna radiating these multiple broadcast TV signals to perform a trilateration or multilateration calculation to determine its position to provide location services.

In this regard, FIG. 1 is a diagram of an exemplary broadcast positioning system 100 that includes a broadcast station 102 that includes a TV signal transmitter 104. As will be discussed in more detail below, the TV signal transmitter 104 is configured to include transmission time and/or signal processing delay information in a transmitted broadcast TV signal 106. This allows a TV signal receiver 108 to more accurately determine the propagation delay of the broadcast TV signal to be used to determine the time differences-of-arrival (TDOA) with other received broadcast TV signals to calculate location of the TV signal receiver 108. In this example, the broadcast station 102 can receive content 110 (or data 110) to be distributed to recipients with TV signal receivers 108 in the broadcast area of its antenna 112 from a broadcast station server 114, for example. The content 110 is provided to the TV signal transmitter 104. The TV signal transmitter 104 can include various circuits and processing hardware, with or without software, to process the content 110 to generate the broadcast TV signal 106 to be transmitted to recipients.

With continuing reference to FIG. 1, the TV signal transmitter 104 may be compatible with Advanced Television Systems Committee (ATSC) standards, for example, such as ATSC 3.0. In this regard, the TV signal transmitter 104 is configured to package the content 110 to be transmitted into communication frames, such as ATSC 3.0 format communication frames. The TV signal transmitter 104 broadcasts the broadcast TV signal 106 over-the-air by radiating the broadcast TV signal 106 from the antenna 112 in a given broadcast coverage area. The broadcast coverage area is dictated by the transmission power of the TV signal transmitter 104, the location of the antenna 112, and according to permissions under applicable communications licenses, such as the Federal Communications Commission (FCC) for broadcast stations in the United States. The TV signal transmitter 104 may be configured to package content in digital communication frames that can then be modulated and converted to an RF analog signal to be broadcast as the broadcast TV signal 106 over the antenna 112. In this regard, the TV signal transmitter 104 may include a processing circuit 116. The processing circuit 116 may include a format circuit 118 that is configured to encapsulate, schedule, and/or frame content 110 to ready it to be processed for transmission, such as according to the ATSC 3.0 standard. The processing circuit 116 may also include a coded modulation circuit 120 to bit-interleave code content prior to modulation symbol mapping, such as according to the ATSC 3.0 standard. The processing circuit 116 may also include a frame circuit 122 configured to generate a communication frame according to the communications standard employed by the TV signal transmitter 104 to format and include a payload of content for transmission as the broadcast TV signal 106, such as according to the ATSC 3.0 standard. The TV signal transmitter 104 may also include a waveform generation circuit 124 configured to generate the communication frame for the content 110 as a waveform at the desired carrier frequency of frequency band in the frequency domain to be passed to an RF transmitter circuit 126. Header information, such as a bootstrap symbol(s) according to the ATSC 3.0 standard, signifying the beginning of the communication frame, may be generated and inserted in the transmitted waveform. The RF transmitter circuit 126 includes circuitry, such as digital-to-analog converters (DAC), RF filters, and amplifiers, to generate the broadcast TV signal 106 to be radiated through the antenna 112.

With continuing reference to FIG. 1, the TV signal receiver 108 having an antenna 128 in the range of the broadcast TV signal 106 can receive the broadcast TV signal 106 to be processed and displayed to a user. For example, the TV signal receiver 108 may include RF receiver circuit 130 to receive, filter, amplifier, and convert to digital format the incoming broadcast TV signal 106. The RF receiver circuit 130 may be optionally coupled to an Internet service provider (ISP) or a cable service provider. The TV signal receiver 108 may also include a demodulation circuit 132 to demodulate the incoming broadcast TV signal 106 from its carrier frequency. The TV signal receiver 108 may also include a control circuit 134 configured to process the demodulated broadcast TV signal 106 for display of its content 110 on a display 136 to a user or recipient.

With reference to FIG. 1, the broadcast positioning system 100 supports inclusion of the broadcast TV signal 106 format that includes a transmission time (e.g., a timestamp) that the broadcast TV signal 106 is transmitted. The transmission time of the broadcast TV signal 106 is used by the TV signal receiver 108 to determine the time of arrival, and thus the propagation delay of the broadcast TV signal 106 between the TV signal transmitter 104 and its reception at the TV signal receiver 108. The broadcast TV signal 106 can also include clock information used by the TV signal receiver 108 to synchronize its clock to the TV broadcast station 102 so that an accurate propagation delay can be calculated based on the timing information included in the received broadcast TV signal 106. The TV signal receiver 108 is also configured to receive multiple broadcast TV signals from multiple TV broadcasters, wherein the same delay of arrival for those broadcast TV signals can be determined. The positions of the antennas of the multiple TV broadcast stations 102 (and more particularly their antennas 112) that transmit respective broadcast TV signals 106 are known and can be programmed to be known by the TV signal receiver 108. In this manner, the TV signal receiver 108 can use the determined multiple delays of arrival from the multiple received broadcast TV signals 106 as time differences-of-arrival (TDOA) and the known locations of the antenna radiating these multiple broadcast TV signals 106 to perform a trilateration or multilateration calculation to determine its position to provide location services.

However, note that the transmission time of the broadcast TV signal 106 may include additional signal processing delay that occurs in the TV signal transmitter between generation of the transmission time and its insertion into a communication frame, and delay in further downstream signal processing of the broadcast TV signal 106. For example, after the broadcast TV signal 106 is framed and the transmission time is generated and inserted in the communications frame, the framed broadcast TV signal 106 may be converted to a waveform (e.g., IQ signals) at a radio frequency (or frequency band) of broadcast station 102 according to their TV transmission license to be transmitted as a radio-frequency (RF) signal as an over-the-air signal. This conversion incurs delay. As another example, further delay in the transmission of the broadcast TV signal 106 can occur when the broadcast TV signal is processed by an RF circuit to create a transmission-ready RF signal. For example, the framed broadcast TV signal 106 may be further processed in the TV signal transmitter 104 by digital-to-analog converters (DACs), filters, amplifiers, and waveguides, such as in the waveform generation circuit 124 and the RF transmitter circuit 126, before being ultimately transmitted over an antenna. Thus, the transmission time will include this additional signal processing delay that is not truly propagation delay, only after the broadcast TV signal 106 is transmitted through the antenna if the transmission time is generated before this further signal processing occurs.

Thus, in exemplary aspects, the transmission time can be compensated by the TV signal transmitter 104 to account (e.g., remove) for an estimation of the additional signal processing time between when the transmission time is generated and the actual transmission time of the broadcast TV signal 106 over the antenna 112. The signal processing delay between when the transmission time is determined and when the broadcast TV signal 106 that is ultimately transmitted over-the-air through the antenna 112 is compensated so that the TV signal receiver 108 does not determine a propagation delay for the broadcast TV signal 106 that includes signal processing time in the TV signal transmitter 104, not truly part of the propagation delay. As another example, the transmission time included in the communication frame of the broadcast TV signal 106 can be generated based on an estimate of the signal processing delay when the transmission time is generated before the additional signal processing of the communication frame is performed to generate the broadcast TV signal 106.

In this manner, the broadcast positioning system 100 allows the TV signal receiver 108 to provide location services without the requirement to include a GPS receiver or other positioning system. The TV signal broadcaster antenna 112 towers act like satellites in a GPS system that are in known locations and where the propagation delay of its transmitted broadcast TV signals 106 can be used by the TV signal receiver 108 to perform a trilateration calculation to determine its position. As an alternative, the TV signal receiver 108 can receive clock information from another source to synchronize its clock with the clock of the TV broadcast station 102. The broadcast positioning system 100 can allow the TV signal receiver 108 to determine its position as a secondary or backup method to other methods, such as through the GPS. For example, the TV signal receiver 108 may be configured to determine location using the broadcast positioning system 100 and also using the GPS through received signals in a GPS receiver. The TV signal receiver 108 can compare the positioning calculations through both systems to determine if a significant enough disagreement between calculated positions exists to note an issue. For example, the position determined by the GPS receiver may have been based on spoofed GPS satellite signals.

In this regard, in one example, the frame circuit 122 of the TV signal transmitter 104 can be configured to receive communications data for the content 110 and generate a communication frame. As will be discussed in more detail below, by example, the communication frame can include a preamble that includes a transmission time field configured to store a transmission time indicating a time of generation of the preamble. The communication frame can also include a payload subframe comprising the communications data. A transmitter circuit 127 in the TV signal transmitter 104 can be configured to generate the broadcast TV signal 106 based on the communication frame over a signal processing time indicative of a signal processing delay in the transmitter circuit 127. The transmitter circuit 127 can be configured to transmit the broadcast TV signal 106 over the antenna 112. The frame circuit 122 is configured to generate the transmission time in a transmission time field of the communication frame based on the time of generation of the preamble and an estimate of the signal processing delay in the transmitter circuit 127.

The TV signal receiver 108 in FIG. 1 includes an RF receiver circuit 130 that is configured to receive a plurality of the broadcast TV signals 106, each comprising a transmission time over the antenna 112 at respective reception times. The TV signal receiver 108 also includes the demodulation circuit 132 configured to demodulate the received broadcast TV signals 106 into a respective plurality of communication frames. The TV signal receiver 108, and more particularly its control circuit 134, is configured to determine the propagation delay of the received plurality of broadcast TV signals 106 based on a difference between their respective reception times and respective transmission time in their respective communication frame. The control circuit 134 is configured to determine the location of the TV signal receiver 108 based on a time differences-of-arrival (TDOA) of the plurality of broadcast TV signals 106 and their respective propagation delays.

The communications standard used to format the broadcast TV signal 106 can be ATSC 3.0 as a non-limiting example. The ATSC 3.0 (NEXTGEN TV) system, when properly calibrated and populated with the correct information, can transmit waveforms that an ATSC 3.0 TV signal receiver can use to calculate its position and time. The system can provide the following services:

- Provide information to the receiver so that the receiver can calculate its position.
- Provide information to the receiver so that the receiver can calculate time and maintain an accurate clock.
- Provide information to the receiver so that the receiver can verify that the location and time computed by other means, such as GPS, are reliable and not spoofed.
- Provide information to the receiver so that the receiver can have independent means of computing position and time when GPS signals are corrupted or unavailable.

Since the ATSC 3.0 system can transmit data, TV towers can also provide the following information to augment GPS service.

- Transmit Real_Time Kinematic (RTK) information so that the RTK-enabled GPS receivers can enhance location accuracy.
- Transmit GPS almanac to reduce GPS receiver's acquisition time.
- Transmit road maps for navigation.
- Transmit real-time traffic and road closure data.

Figure 2:
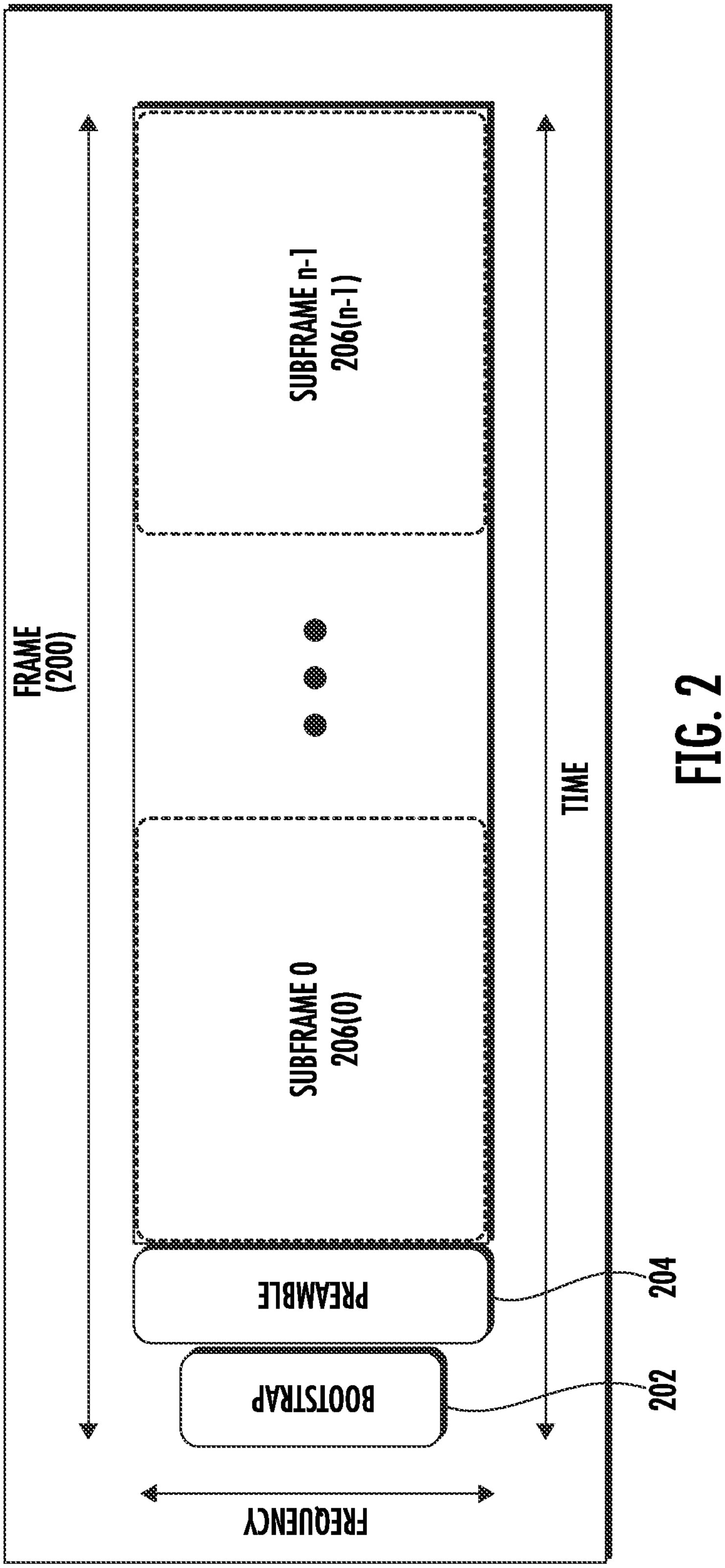
FIG. 2 is a diagram illustrating the Advanced Television Systems Committee (ATSC) 3.0 communication frame for broadcast television (TV) signals that can be transmitted and received in a broadcast positioning system, including the broadcast positioning system in FIG. 1.

FIG. 2 is a diagram illustrating an ATSC 3.0 communication frame 200 for broadcast TV signals that can be transmitted and received in a broadcast positioning system, including the broadcast positioning system 100 in FIG. 1. As shown in FIG. 2, the ATSC 3.0 communication frame 200 has three parts: a bootstrap 202, a preamble 204, and subframes 206(0)-206($n$−1). The bootstrap 202 is also referred to as a "bootstrap signal 202."

Figure 3:
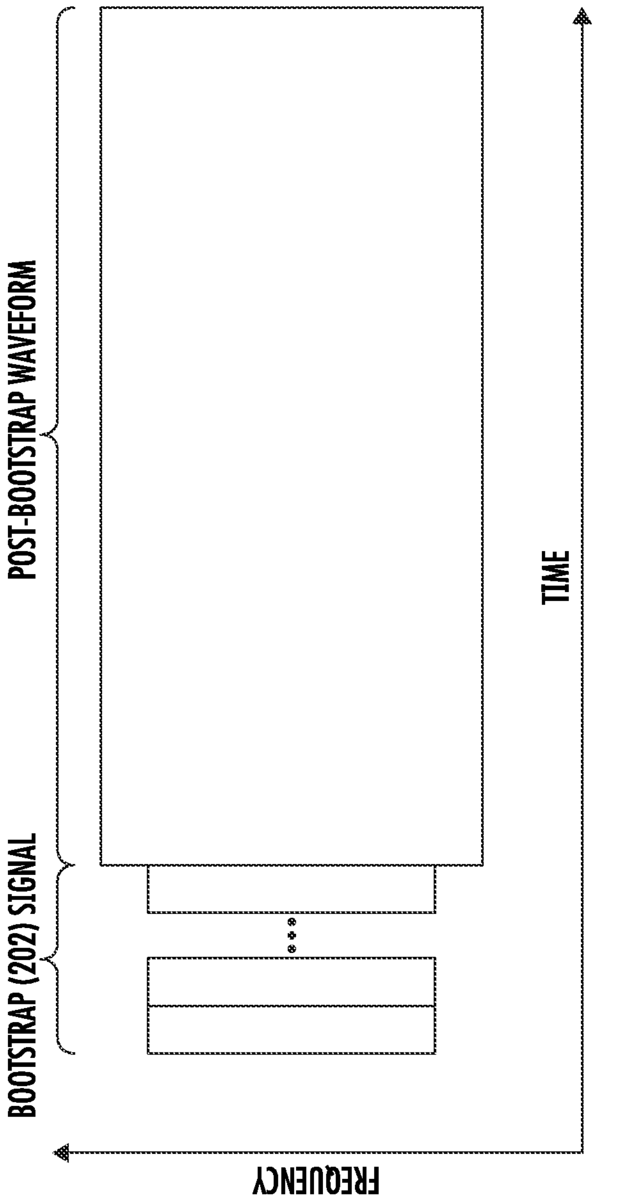
FIG. 3 is a diagram illustrating the bootstrap of the ATSC 3.0 communication frame in FIG. 2.

FIG. 3 is a diagram illustrating the bootstrap 202 of the ATSC 3.0 communication frame 200 in FIG. 2. The bootstrap 202 is the most resilient part of the ATSC 3.0 communication frame 200, and it holds the key to decode other parts of the ATSC 3.0 communication frame 200 and the subsequent bootstrap 202. This signal will also be the most useful in measuring the time of arrival of the frame at the TV signal receiver 108. Each bootstrap symbol is 0.5 ms long and has a bandwidth of 4.5 MHz. The ATSC 3.0 standard defines three bootstrap 202 symbols.

Figure 4:
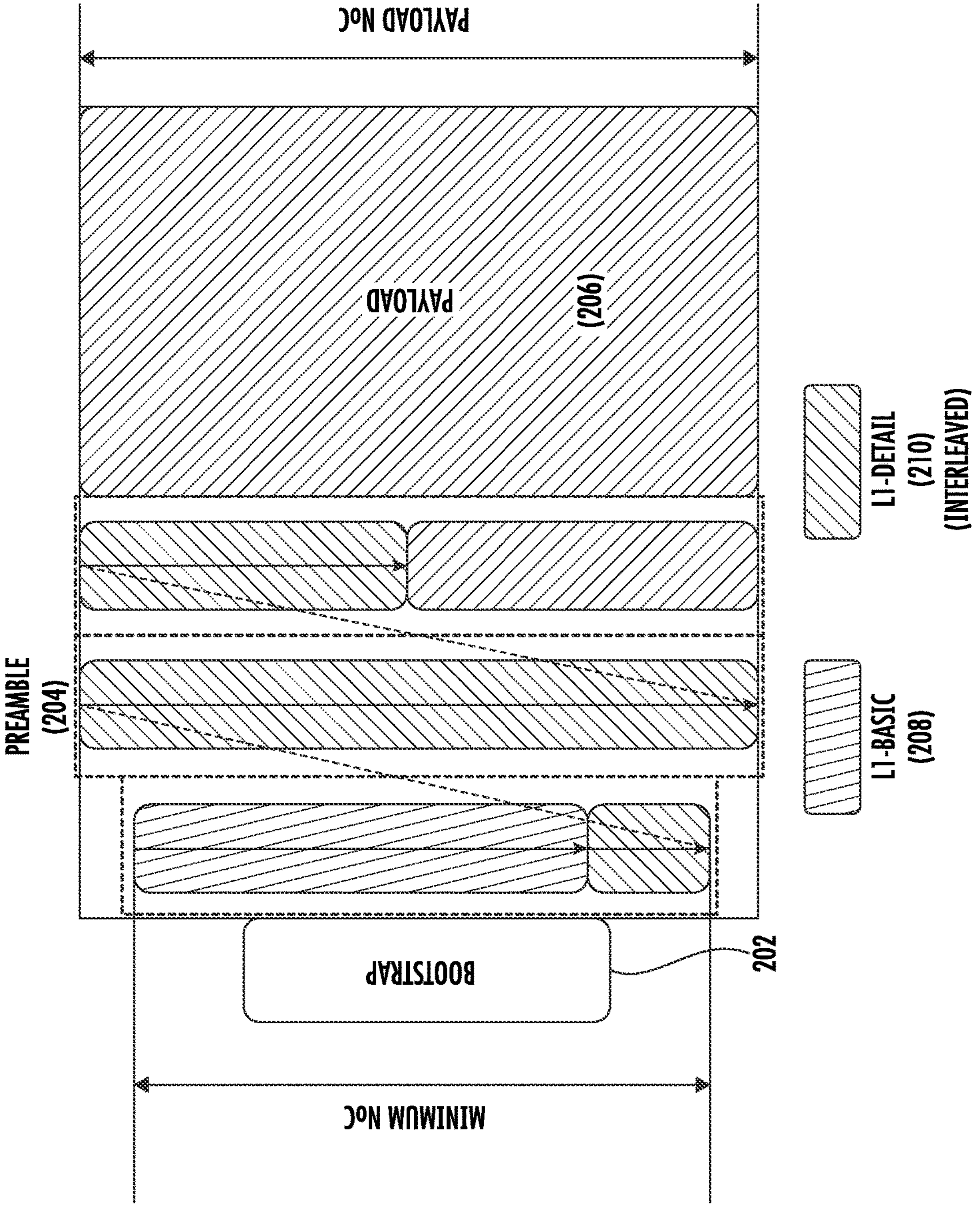
FIG. 4 is a diagram illustrating a preamble of the ATSC 3.0 communication frame in FIG. 2.

FIG. 4 is a diagram illustrating a preamble 204 of the ATSC 3.0 communication frame 200 in FIG. 2. The preamble 204 follows right after the last bootstrap 202. The bootstrap 202 carries the information to decode the preamble 204, and the preamble 204 carries the information to decode the subsequent subframes 206(0)-206($n$−1). The preamble 204 carries two sets of L1 signaling (physical layer data) called L1-Basic 208 and L1-Detail 210, which can be configured to indicate when the first symbol of the bootstrap signal 202 was transmitted from the transmission antenna 112. Calibration of the transmission path delay, synchronizing the transmission with an accurate clock, and populating the L1-Basic 208 and L1-Detail 210 data fields are the keys to providing positioning and timing. Subframe structures are defined in the preceding preamble 204. Data carrying physical layer pipes (PLP) are formed in the subframes 206(0)-206($n$−1). All the information relating to other ATSC 3.0 formatted payload information and GPS will be carried by the subframes 206(0)-206($n$−1). Calibration, synchronization, and configuration will be discussed in detail in the following section.

FIG. 5A is a table 500 illustrating the L1-Basic 208 signaling field and syntax in the L1-Basic 208 field of the preamble 204 of the ATSC 3.0 communication frame in FIG.

4. The L1-Basic 208 includes an L1B_time_info_flag, which is configured to indicate the presence or absence of timing information in the current frame, and the precision to which the timing information is signaled according to the table below.

| Value | Meaning |
|---|---|
| 00 | Time information is not included in the current frame |
| 01 | Time information is included in the current frame and signaled to ms precision |
| 10 | Time information is included in the current frame and signaled to μs precision |
| 11 | Time information is included in the current frame and signaled to ns precision |

FIG. 5B is a table 502 illustrating the L1-Detail 210 signaling field and syntax in the L1-Detail 210 field of the preamble 204 of the ATSC 3.0 communication frame in FIG. 4. The L1-Detail 210 includes an L1D_time_sec field, which is the seconds portion of the precise time at which the first sample of the first symbol of the most recently received bootstrap was transmitted. The L1D_time_sec field shall contain the 32 least significant bits of the number of seconds elapsed between the PTP epoch and the precise time at which the first sample of the first symbol of the most recently received bootstrap was transmitted. For example, if the precise time was 17:30:48 UTC (i.e., 17:31:24 TAI) on the $12^{th}$ February 2016, there would have been exactly 1455298284 seconds elapsed since the PTP epoch (which is $1^{st}$ January 1970 00:00:00 TAI) and the value transmitted in this field would be 0×56BE16EC. The difference between TAI and UTC seconds is singled in A/331 SystemTime@currentUtcOffset. The time value shall be transmitted at least once in every 5 second interval.

Figure 6:
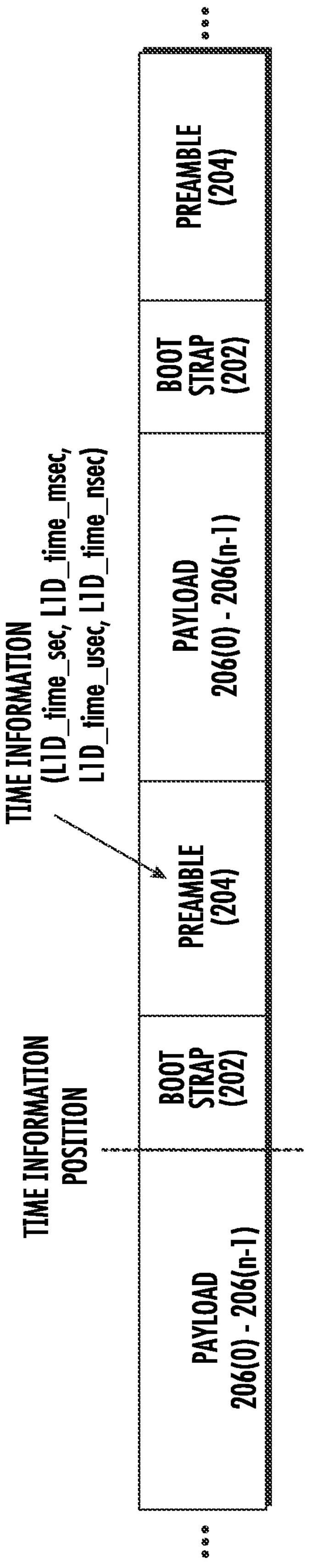
FIG. 6 is a table illustrating sequential ATSC 3.0 communication frames.

FIG. 6 is a table illustrating sequential ATSC 3.0 communication frames. With reference to FIGS. 5A, 5B, and 6, the parameters in the L1-Basic 208 will be populated with the proper values so that the preamble will define the first bootstrap symbol emission time with the required accuracy. The best results will be achieved with nanosecond accuracy, but that also requires accurate calibration of the transmission chain delay. The L1B_time_info_flag indicates the presence or absence of timing information (i.e., transmission time) in the current frame and the precision to which it is signaled. The L1D_time_sec field is the second portion of the precise time at which the first sample of the first symbol of the most recently received bootstrap 202 was transmitted as part of a transmission time. L1D_time_sec contains the 32 least significant bits of the number of seconds of elapsed time between the PTO epoch and the precise time at which the first sample of the first symbol of the most recently received bootstrap 202 was transmitted. The L1D_time_msec field indicates the milliseconds component of the transmission time information specified under L1D_time_sec. The L1D_time_usec field indicates the microseconds component of the transmission time information specified under L1D_time_sec. The L1D_time_nsec field indicates the nanoseconds component of the transmission time information specified under L1D_time_sec.

Figure 7:
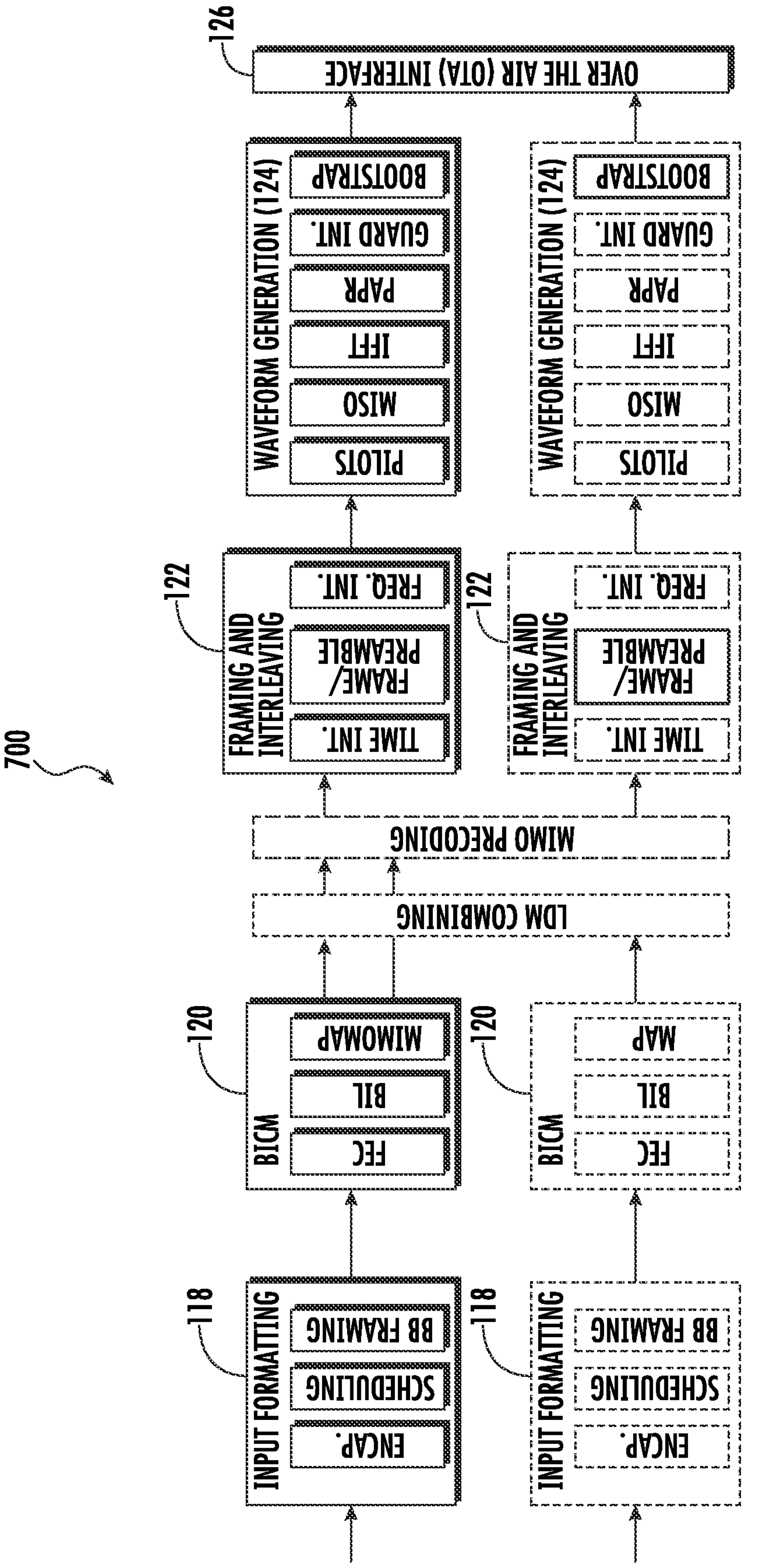
FIG. 7 is a formation preamble and bootstrap in the digital transmission chain for transmitting an ATSC 3.0 broadcast TV signal.

FIG. 7 is a formation preamble and bootstrap in a digital transmission chain 700 for transmitting an ATSC 3.0 broadcast TV signal. The preamble 204, which describes the transmission time of the bootstrap signal 202, is formed before the bootstrap in the logical flow. The digital transmission chain 700 includes circuits that are referenced in the TV signal transmitter 104 in FIG. 1. After the waveform is generated in the digital domain by the waveform generation circuit 124, the signal passes through DACs, filters, amplifiers, and transmission lines before it reaches the antenna 112. Therefore, the TV signal transmitter 104 is configured to insert transmission time information in the preamble 204 to compensate for the total digital and analog electrical component delays (a.k.a. group delays). For example, suppose the preamble 204 is formed at time $t_g$, and the total digital and analog delays from the time of preamble 204 formation and the $1^{st}$ symbol of bootstrap 202 transmission is $\tau$. Then, the L1 Detail Signaling Fields 210 of the preamble 204 should indicate the time $t_g+\tau$. The transmission chain needs to be calibrated and measured so that the value of $\tau$ is estimated with required accuracy. Accurate measurement and characterization of this delay are important for position calculation accuracy. One way to estimate this delay is to measure the time-of-arrival (TOA) of the transmitted signal at a known location. For good accuracy, the measurement device should have line of sight (LOS) from the transmitting antenna 112, the area should not have strong multipath, and the device should be placed far enough (or have RF shielding) so that it does not lock to the leaked signal from the base of the antenna 112 tower.

Figure 8A:
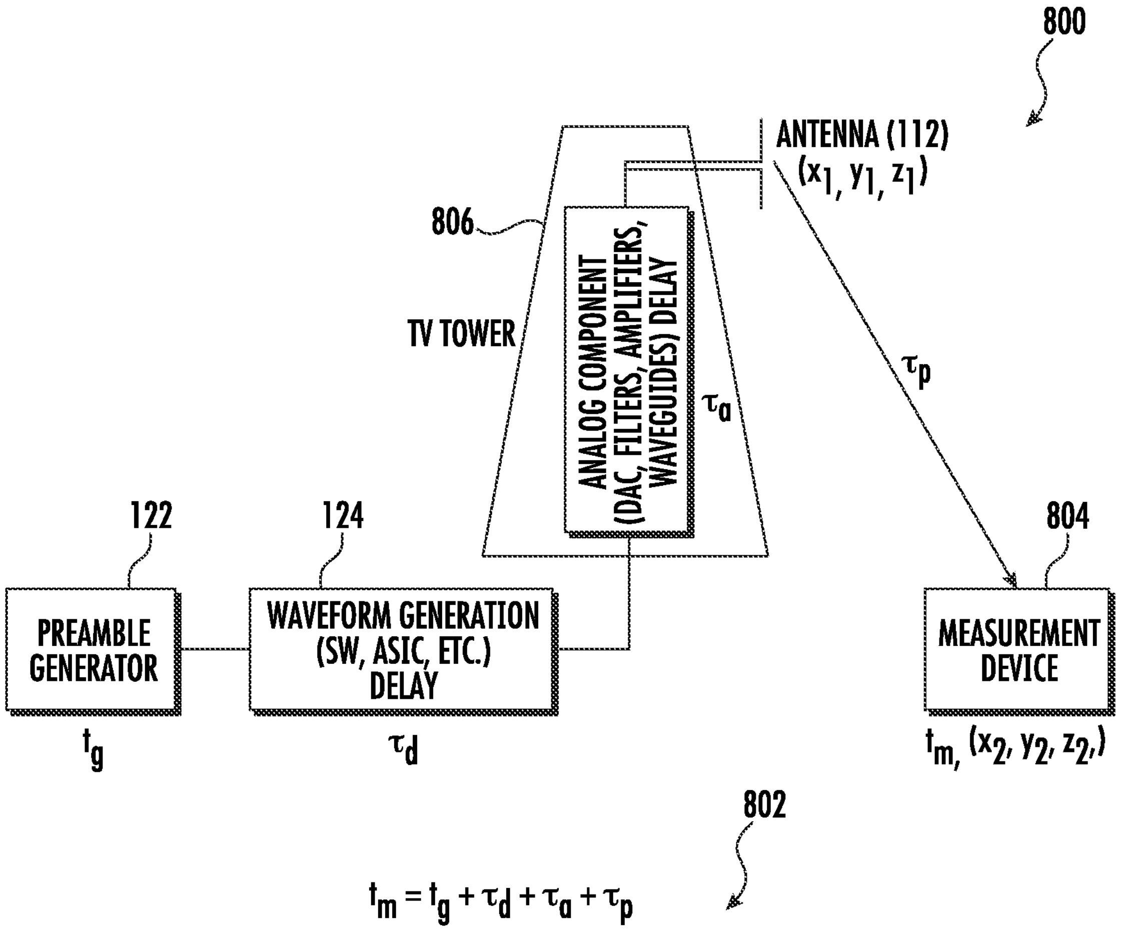
FIG. 8A is a diagram illustrating how delay components in the digital transmission chain in FIG. 7 can be measured according to one embodiment of the present disclosure and related equations to calculate true transmission time to compensate for the additional delay that would otherwise be included in transmission time.

FIG. 8A is a diagram 800 illustrating how delay components in the digital transmission chain 700 in FIG. 7 can be measured according to one embodiment of the present disclosure. Note the following symbols and equations:

$t_g$: time when the preamble containing the L1-Basic and L1-Detail signaling fields are created.

$\tau_d$: the delay between preamble creation and waveform generation. This digital domain delay is caused by software and/or hardware of the equipment used.

$\tau_a$: the delay of the analog components, which include DAC, filters, amplifiers, and waveguides.

$\tau$: total transmission chain delay (a.k.a. group delay) that is equal to $\tau_d+\tau_a$.

$\tau_p$: propagation delay of signal from the antenna to the measurement device $(x_1, y_1, z_1)$: location of the antenna $(x_2, y_2, z_2)$: location of the measurement device c: speed of light Equations 802 illustrate how the group delay ($\tau$) in the digital transmission chain 700 can be calculated such that it can be compensated in the transmission time so as to exclude the group delay from the propagation delay as perceived by a TV signal receiver. In a non-limiting example, a measurement device 804 is placed in LOS from the antenna 112 in a TV tower 806. The measurement device 804 receives the preamble at time $t_m$, which is equal to a sum of $t_g$, $\tau_d$, $\tau_a$, and $\tau_p$ according to a first one of the equations 802. The measurement device 804 can also calculate the propagation delay ($\tau_p$) based on a third one of the equations 802. Accordingly, the measurement device 804 can determine the group delay ($\tau$) according to a second one of the equations 802. Although the group delay ($\tau$) is expected to be fairly constant over a period of time, practical implementations of the system will need to monitor the timing alignment continuously because timing accuracy is critical to the overall system performance. For example, the measurements from the measurement device 804 can be used to automatically and continuously adjust the timing so that the emission time of the first sample of the first symbol of the bootstrap always matches the timing information carried in the preamble within the desired accuracy. The concept of a closed-loop timing error tracking and automatic timing adjustment system is discussed next in reference to FIG. 8B.

Figure 8B:
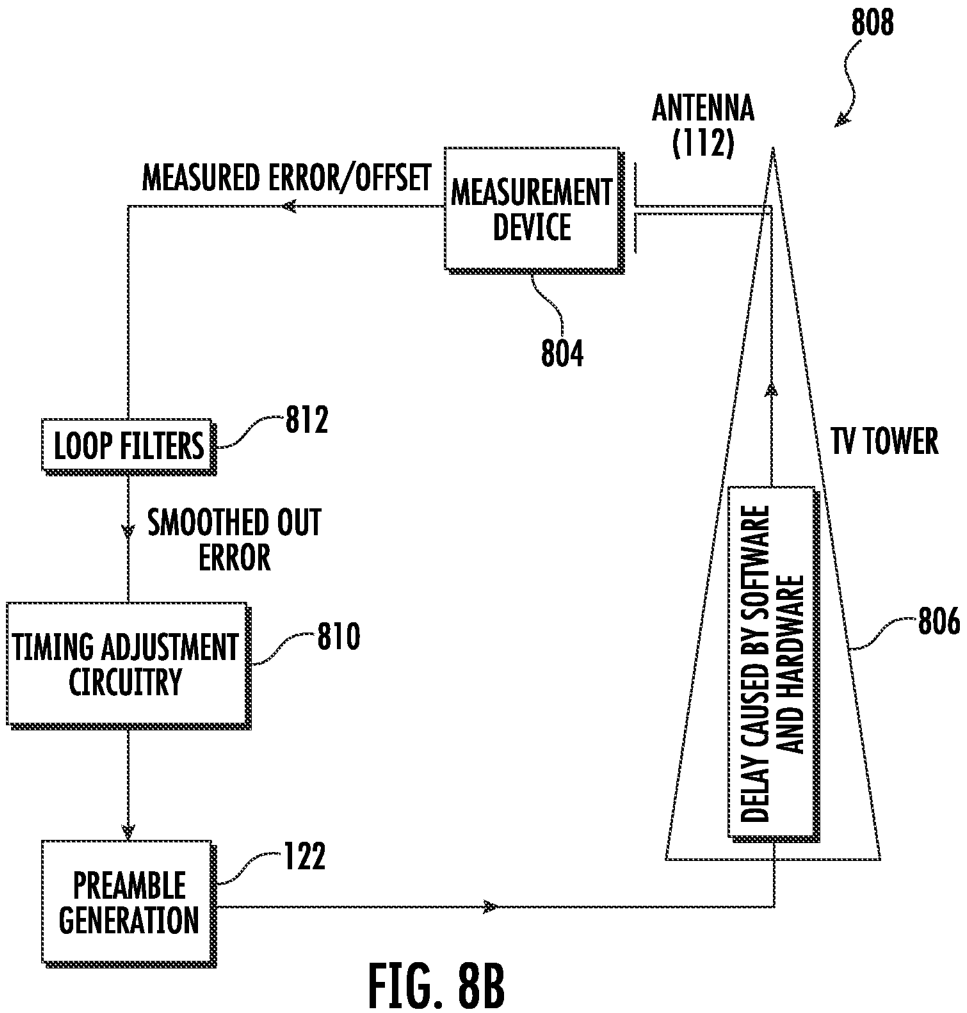
FIG. 8B is a diagram illustrating how a delay in delay components in the digital transmission chain in FIG. 7 can be measured according to another embodiment of the present disclosure to calculate true transmission time to compensate for the additional delay that would otherwise be included in transmission time.

FIG. 8B is a diagram 808 illustrating how delay in delay components in the digital transmission chain 700 in FIG. 7 can be measured according to another embodiment of the present disclosure to calculate true transmission time to compensate for the additional delay that would otherwise be included in transmission time. Common elements between FIGS. 8A and 8B are shown therein with common element numbers and will not be re-described herein.

The measurement device 804 in FIG. 8B is placed close to the antenna 112 at the top of the TV tower 806. The measurement device 804, whose location is accurately known, receives accurate timing information either from GPS or from another type of independent clock. The measurement device 804 demodulates the bootstrap 202 and the preamble 204, and estimates the timing error between the actual emission time of the first sample of the first symbol of the bootstrap 202 and the timestamp (transmission time) carried in the preamble 204. Timing adjustment circuitry 810 can make the adjustment to the transmission time in the preamble 204 to compensate for the delay in delay components in the digital transmission chain 700 in FIG. 7 to calculate true transmission time to compensate for the additional delay that would otherwise be included in transmission time. Measured errors can then be smoothed out using a loop filter 812 and the suggested corrections made by the timing circuitry of the preamble 204 generation.

The BPS service can be enabled with either an existing bootstrap 202 of major and minor version 0 as defined in the ATSC 3.0 standards, or with a new bootstrap with a new set of major and minor versions. In the first instance, the solution can be a part of the NEXTGEN TV service, whereas in the second instance, with new major and minor versions, the solution will be an independent service delivered on the same frequency or channel. An advantage of the overlay broadcast positioning system discussed above to compensate for transmission time in a broadcast TV signal on existing NEXTGEN TV service is that it may be simpler to implement within regulatory constraints. However, depending on another service may mean less freedom in choosing the parameters. In contrast, an independent broadcast positioning system service using a new bootstrap can be optimized without being subject to the restrictions imposed by the ATSC 3.0 standards.

At a minimum, every TV station needs to transmit its location (e.g., World Geodetic System 1984 (WGS 84), WGS 84 XYZ, or other geodetic coordinates of latitude, longitude, and altitude) to the receiver via a PLP so that the receiver knows when and where the bootstrap was transmitted. However, the signal detection at the receiver can be made more efficient and resilient if additional information about the transmitting antenna of the TV station and its neighboring TV stations can be transmitted to the receiver. Herein, a first TV station is said to be neighboring with a second TV station if a signal(s) emitted by a respective antenna(s) of the first TV station can be received by a respective antenna(s) of the second TV station in a respective coverage area of the second TV station, regardless of whether the first TV station and the second TV station are configured to operate in same or different radio frequencies. For example, the first TV station can be configured to operate with just one transmitter and/or antenna at frequency $f_1$ and the second TV station can be configured based on a single frequency network (SFN) configuration to operate with three transmitters and/or antennas at frequency $f_2$. In this regard, the first TV station will still be considered by the second TV station as the neighboring TV station as long as the signal(s) emitted at frequency $f_1$ can be received by the respective antenna(s) of the second TV station. Likewise, the three transmitters and/or antennas of the second TV station will each be considered by the first TV station as the neighboring TV station as long as the signal(s) emitted at frequency $f_2$ can be received by the respective antenna(s) of the first TV station. Further, each of the three transmitters and/or antennas at frequency $f_2$ will consider any other two of the three transmitters and/or antennas at frequency $f_2$ as neighbors. In addition to the time information embedded in the preamble, the following is a desired set of data fields that will be transmitted in the PLP that is carried by subframes.

- Transmit Antenna ID (a unique ID, such as callsign, to distinguish the antenna)
- Transmit antenna's position (e.g., WGS 84 XYZ), or latitude, longitude, and elevation.
- Transmit antenna's power level.
- Transmit antenna's radiation pattern (and/or average coverage radius).
- Neighbor Antenna ID (a unique ID, such as callsign, to distinguish the antenna)
- Neighbor channel (frequency)
- Neighbor antenna's position (x, y, z), or latitude, longitude, and elevation.
- Neighbor antenna's power level.
- Neighbor antenna's radiation pattern.
- Timing offset of the neighbor bootstrap signal relative to the transmitting bootstrap. This offset could either be the one measured at the transmitted site or can be compensated for the distance traveled.
- Current number of leap seconds expressed as TAI-UTC (This value is desired here so that decoding of A/331 messages of the video service is not required for location computation)
- SFN transmitter IDs of SFN antennas that form the SFN
- Timing offsets of each of the SFN transmissions
- Frequency offsets, if any, of each of the SFN antennas
- Transmit Diversity Code Filter Sets (TDCFSs) of each of the SFN transmitters
- Reported bootstrap transmission time of the previous frame
- Measured time-stamp reporting error of the previous frame Among the parameters listed above, the SFN transmitter IDs, the timing offset, the frequency offsets, and the TDCFSs are only required for the SFN operation, while the reported bootstrap transmission time of the previous frame and the measured time-stamp reporting error of the previous frame are only required if a history of neighbor measurement errors is desired. These parameters will be further explained later in the description. All of the above values may be somewhat static except the relative bootstrap timing offset, which will need to be continually measured at the transmitting antenna.

The BPS may be utilized to provide GPS enhancement data to help speed up GPS satellite acquisition. It takes at least 12.5 minutes for a GPS receiver to retrieve a satellite's complete navigation messages, commonly known as a Master Frame. A Master Frame, which is 37500 bits long, contains satellite ephemeris, almanac, clock corrections, health indicators, etc. There is an opportunity for the TV towers to transmit information that will help the GPS receiver to lock the GPS satellites faster. The GPS almanac would be most useful in determining which satellites the GPS receiver should search for. The reference point could be the location of the TV antenna. As an additional service, the TV broadcaster can also transmit the Master Frames or parts of Master Frames.

The BPS may also be utilized to provide navigation data, such as local maps and real-time traffic information, periodically.

Notably, the transmission system needs to be synchronized with an accurate clock. Using GPS is an easy option, but it also means reliance on the GPS service. Alternatively, the transmission facility can use an accurate, independent clock. Another practical solution would be to use an accurate, free-running clock that periodically synchronizes with national atomic clocks. Using a clock that does not rely on GPS makes the broadcast positioning service more resilient when the GPS signal is compromised.

To enable BPS, a TV signal receiver can include the following capabilities:

Simultaneously tune to multiple TV channels; demodulate bootstrap, preamble, and subframes; and extract the messages.

Be able to timestamp RF or baseband I/Q samples so that time of arrival of the signal can be computed.

Be able to maintain a free-running clock that is accurate enough between the multichannel measurements.

One example of a typical receiver may include multiple tuners, one for each frequency or channel, followed by a timestamped buffer to collect the baseband samples. The receiver will demodulate the frames and extract the positioning, timing, and navigation-related information. By correlating the buffered and timestamped samples against a replica of the bootstrap, the time of arrival (TOA) of the $1^{st}$ bootstrap symbol can be determined.

Since the TOA of the neighboring station would be known, the number of required tuners can be reduced by tuning to a given frequency only when a signal is expected. Another approach would be to capture the RF or I/Q samples of multiple frequency bands using a wideband receiver. Each channel can then be extracted by known digital signal processing techniques. Neighbor timing information will be helpful in this type of implementation.

Position and time in BPS can be computed using TOA and pseudo-range-based multilateration or by time difference of arrival (TDOA) based hyperbolic positioning. Although the theoretical constructs of these methods are based on the same measurements, the imperfections in system behavior and system components can make one method more accurate or efficient than the other. An RF finger-printing-based location estimation, which has a different construct than trilateration or hyperbolic positioning, is also possible.

Figure 9A:
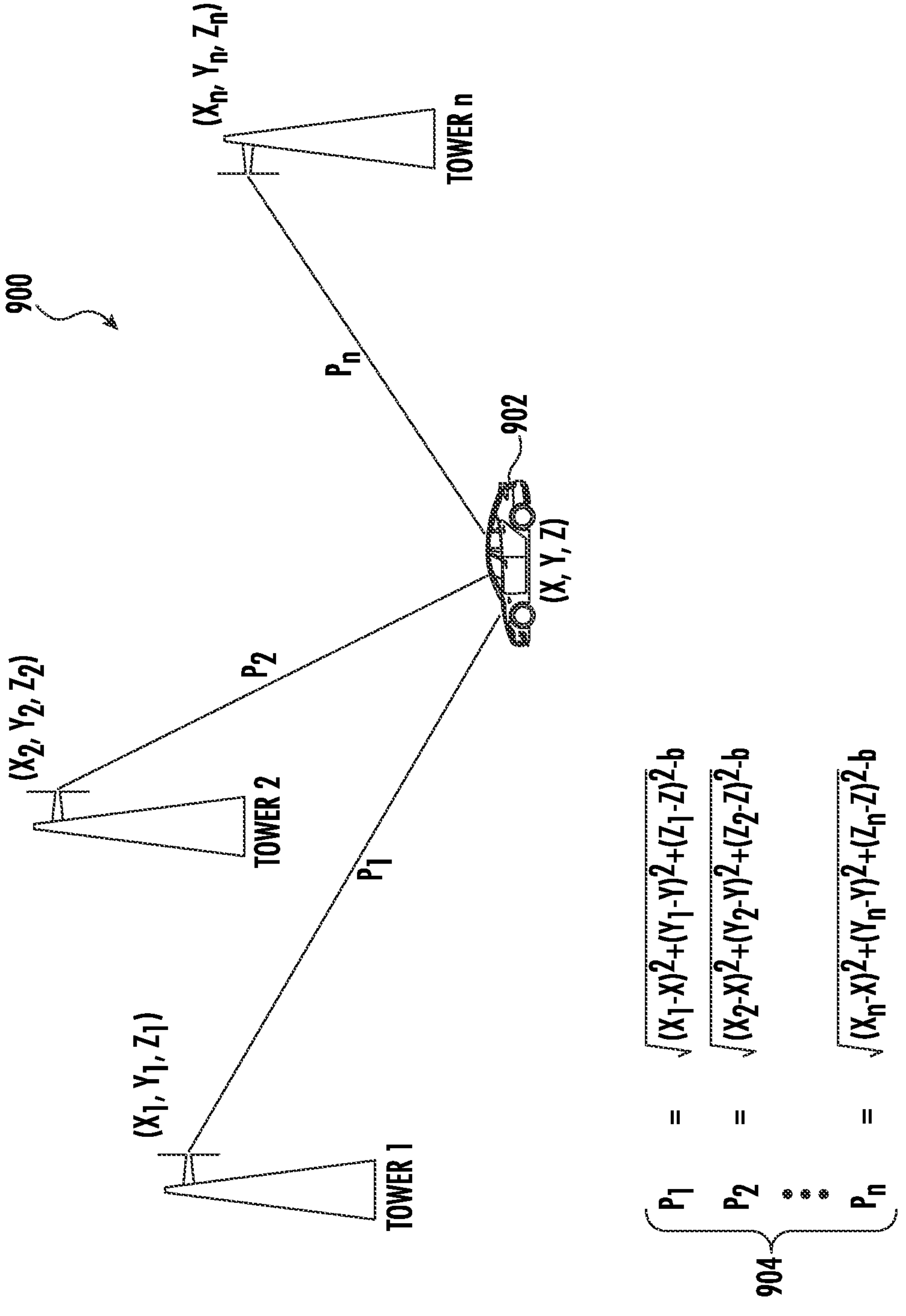
FIG. 9A is a diagram illustrating trilateration.

FIG. 9A is a diagram illustrating trilateration 900 that can be used by a TV signal receiver, such as the TV signal receiver 108 in FIG. 1, to determine its location based on trilateration and, more specifically, the transmission time embedded in received TV broadcast signals with propagation delays P1, P2, and Pn. Below is a list of parameters that are relevant to the trilateration.

(x, y, z): position of the receiver that needs to be computed $(x_k, y_k, z_k)$: position of $k^{th}$ transmission antenna, where k=1, 2, . . . n.

$\rho_k$: pseudo-range for the $k^{th}$ antenna, where k=1, 2, . . . n.

b: clock bias expressed in the same unit as x, y, and z. If Δt is receiver clock offset compared to the accurate timescale the TV transmission facilities are using, and if c is the speed of light, then b=c Δt.

As discussed above, the TV signal transmitter 104 is configured to compensate for the group delay incurred in the digital transmission chain 700 in FIG. 7 that would otherwise be included in the transmission time, thereby adding this delay to the true propagation delay of a TV broadcast signal. In this regard, given three antenna towers, TOWER 1, TOWER 2, and TOWER 3, and a receiver 902, which may be a TV signal receiver, the position of the TV signal receiver 902 can be calculated using the propagation delays equations in 904 by solving three (3) equations with three variables x, y, z, and based on the known $x_1$, $y_1$, $z_1$ location of TOWER 1, the known $x_2$, $y_2$, $z_2$ location of TOWER 2, and the known $x_3$, $y_3$, $z_3$ location of TOWER 3. The solved three variables x, y, z will be the three (3) axis locations of the TV signal receiver 902. The set of equations can be solved for x, y, z, and b to get the position and time estimates of the TV signal receiver 902. The set of nonlinear equations are solved by an iterative process that involves Taylor series expansion and steepest gradient approach. Least square and weighted least square approach is used if more than four (4) pseudo-ranges are available (i.e., if n>4).

Figure 9B:
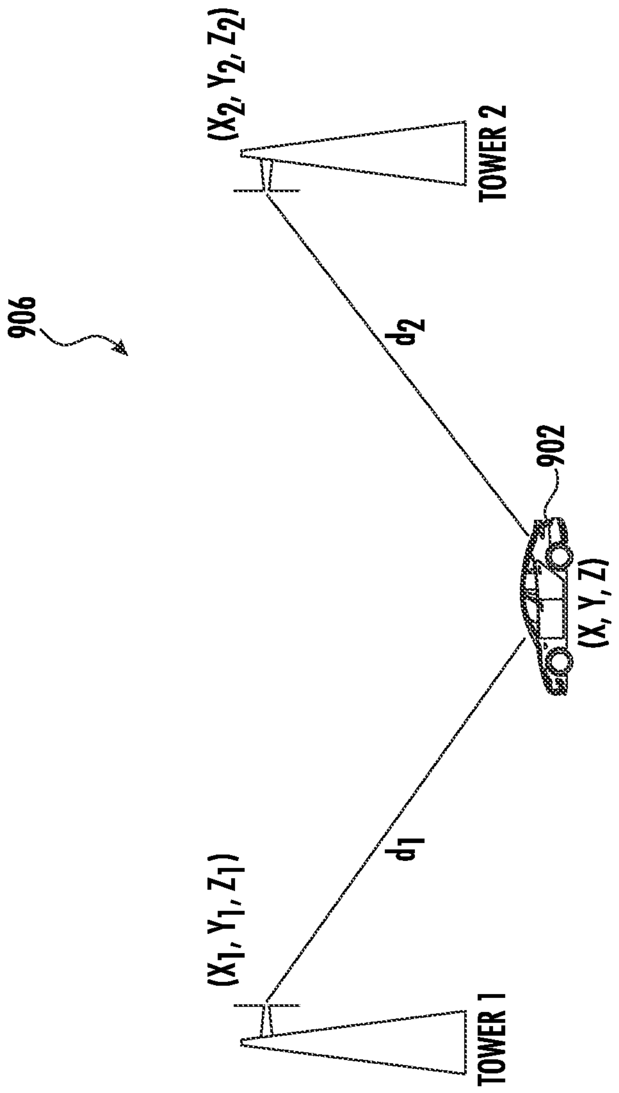
FIG. 9B is a diagram illustrating hyperbolic positioning.

FIG. 9B is a diagram illustrating the calculation of positioning using hyperbolic positioning 906 that can also be used with two antennas, TOWER 1 and TOWER 2. Below is a list of parameters that are relevant to hyperbolic positioning.

(x, y, z): position of the receiver that needs to be computed.

$(x_k, y_k, z_k)$: position of $k^{th}$ transmission antenna, where k=1, 2, . . . n.

$d_k$: distance between the $k^{th}$ TV antenna and the receiver.

Figure 10:
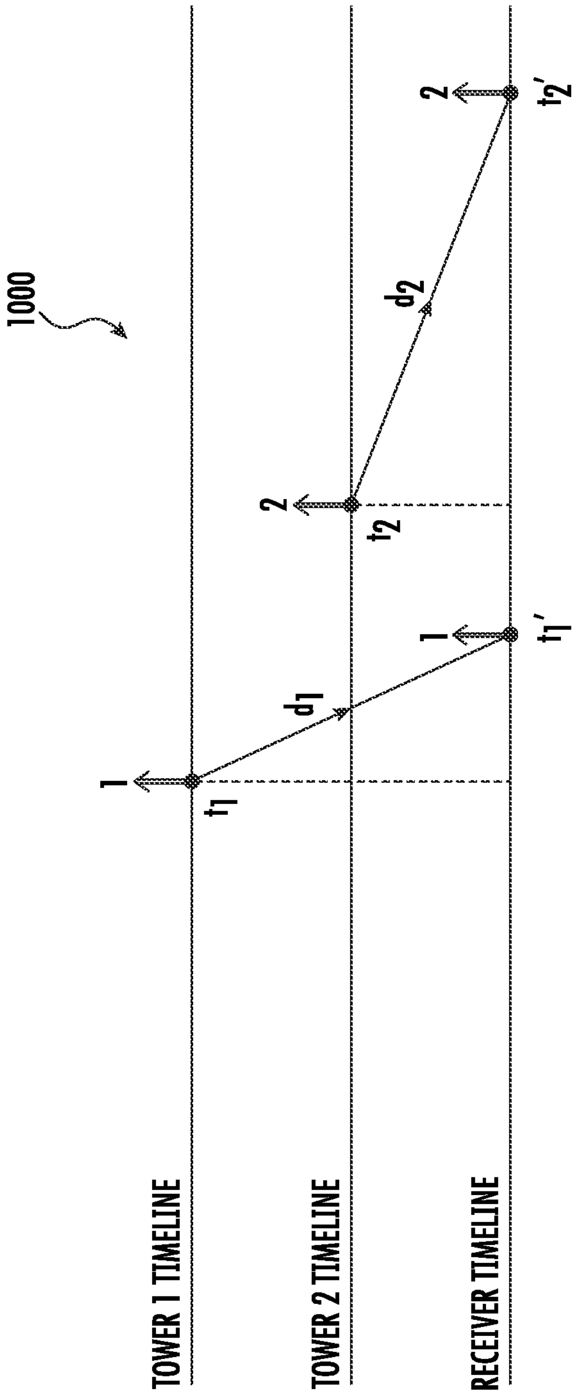
FIG. 10 is a diagram illustrating the calculation of positioning using hyperbolic positioning.

The hyperbolic positioning method can be further explained with reference to FIG. 10. In this regard, FIG. 10 is a diagram 1000 illustrating the calculation of positioning using the hyperbolic positioning 900 in FIG. 9. In an embodiment, the hyperbolic positioning 900 can be performed based on a set of TDOA equations as shown below.

$$t_1'=t_1+d_1/c+\Delta t$$

$$t_2'=t_2+d_2/c+\Delta t$$

$$d_2-d_1=c[(t_2'-t_1')-(t_2-t_1)$$

Δt: receiver clock offset compared to the accurate timescale the TV transmission facilities are using.

$t_k$: Bootstrap transmit time from the $k^{th}$ antenna.

$t_k'$: Bootstrap receive time at the receiver expressed in receiver timescale that has bias.

c: speed of light.

The above TDOA equations involve two transmitting antennas. The set of equations for n number of transmitting antennas follows in the equations 1100 in FIG. 11. The unknown parameters x, y, and z are solved for position. Once the location of the receiver is calculated, the time offset can be found as $\Delta t=t_1'-t_1-d_1/c$. Note that four (4) antennas provide three (3) TDOA equations. In general, n antennas will provide (n−1) TDOA equations. The set of nonlinear equations are solved by an iterative process that involves Taylor series expansion and steepest gradient approach. Least square and weighted least square approach is used if more than three (3) TDOA equations are available (i.e., if n>4).

Since the antenna height, frequency, antenna pattern, and transmission power of the TV towers will be known, there is an opportunity to compute the location of the receiver based on electromagnetic propagation characteristics. One approach is to use a suitable propagation model that indicates the signal strength as a function of distance. Comparing the values with received signal strength will lead to approximate ranges from the TV antennas. There are other heuristic approaches that provide reasonably good estimates. For example, weighted average, based on the received signal strength level, of the coordinates of the TV tower will also provide reasonable estimates.

Accuracy of an RF fingerprinting method will be lower than trilateration or hyperbolic positioning. Position calculated by the RF fingerprinting method can be used to validate location computed by other methods.

Figure 12:
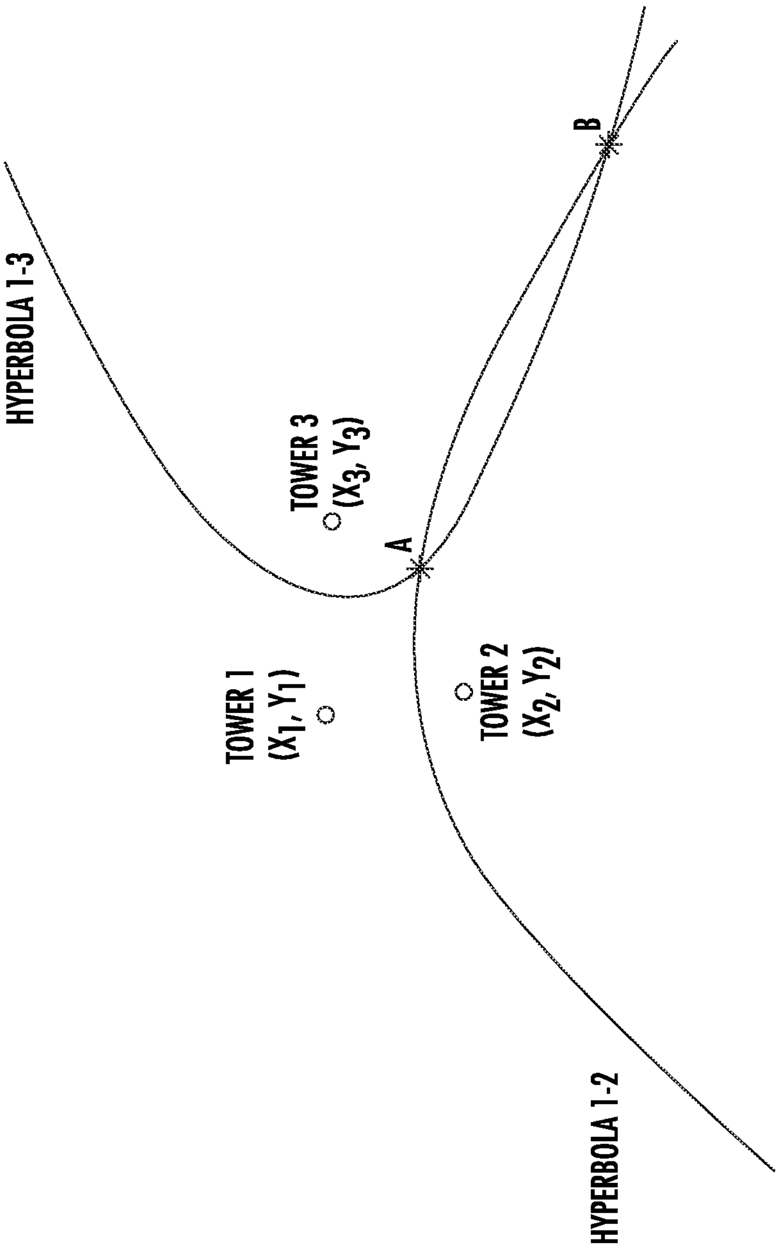
FIG. 12 is a diagram illustrating hybrid positioning.

Location computation can be optimized by using additional information that one of the methods may require. FIG. 12 provides an exemplary illustration of a hybrid positioning method according to an embodiment of the present disclosure. To make the illustration simpler, a hyperbolic positioning example based on X-Y plane, which assumes z=0 for the TV antenna and receiver locations, is illustrated herein. In this example, the receiver detects the signal from three geographically distinct towers. Using the TDOA approach, the following two quadratic equations can be established with two unknowns.

$$\sqrt{(x_1-x)^2+(y_1-y)^2}-\sqrt{(x_2-x)^2+(y_2-y)^2}=c\Delta t_{12}$$

$$\sqrt{(x_1-x)^2+(y_1-y)^2}-\sqrt{(x_3-x)^2+(y_3-y)^2}=c\Delta t_{13}$$

The above equations, mathematically, will have two sets of (x,y) solutions, which means that the hyperbolas may intersect at two points A and B, as shown in FIG. 12. In an embodiment, it is possible to use a hybrid method to eliminate one of the points. Since the neighbor list will provide the antenna locations, power level, and antenna patterns, an electromagnetic propagation model can predict which of the two intersecting points A and B is more likely to be the receiver location based on the observed signal level at the receiver. In this case, for example, point A may seem to be more likely than point B to be the location of the receiver.

Other heuristics based on the neighbor data can also be used. For example, it is possible to choose the point closest to the centroid, which could be either geographical average $((x_1+x_2+x_3)/3, (y_1+y_2+y_3)/3)$ or weighted geographical average $((P_1x_1+P_2x_2+P_3x_3)/3, (P_1y_1+P_2y_2+P_3y_3)/3)$, where $P_1$, $P_2$, and $P_3$ are weights computed using the transmit power levels of the TV antennas at Tower1, Tower2, and Tower3. Point A will be more likely with this approach.

In an embodiment, BPS can also be used to verify that GPS position and time are not being spoofed. This will be a basic sanity check of the GPS locations. For example, if a location computed by GPS is 90 miles away from the location computed by BPS, or if the time computed by GPS is 500 μs apart from BPS time, it can be inferred that one of the systems has been compromised.

The RF signal characteristics transmitted as neighbor data in the BPS can also be used as an additional validation method. If the surrounding tower locations, antenna patterns, bootstrap timing offsets, and transmit power levels do not agree with what is observed by the BPS receiver at the GPS computed location, it can be inferred that the GPS satellite signal has been compromised.

The detailed neighbor information transmitted in BPS can also serve as self-validation. Location computed by triangulation method can be validated with RF characteristics such as tower locations, antenna patterns, bootstrap timing offsets, and transmit power levels. Since TV service is offered by different companies on different channels, spoofing all of these pieces of interdependent information in real-time is challenging.

If the GPS signal is corrupted or spoofed in a small geographic area, the broadcast signal emitted from far away towers can be used as the validating signal even if those towers use GPS themselves. Such validation is possible because the TV towers will be outside the spoofed GPS signal area. If the TV towers use a clock reference independent of GPS, location validation will be more resilient and will work in the event of widespread GPS outage.

In addition, BPS location can also be a fallback solution when GPS is unavailable or is compromised.

The timing information transmitted by the TV antenna can be a good reference of time when two-way communication, which is required for PTP protocol, is unavailable. Below are two examples for establishing and maintaining a timescale in the receiver.

In a first example, it is possible to compute an approximate position of the receiver with 300-meter accuracy. The propagation delay between the TV antenna and the receiver can be computed, and the timing offset can be adjusted in the receiver. With 300-meter position uncertainty, the timescale will be about 1 μs accurate.

In a second example, it is possible to compute an approximate position of the receiver in case only the TV antenna coverage area is known. If the triangulated position of the receiver is unknown, the proximity of the TV station can be used for establishment of a timescale. Say a TV station's coverage area is defined by a 50-mile radius. If the receiver assumes that it is 25 miles (half of the radius) away from the TV antenna, the maximum propagation error will be 135 μs.

The BPS may also be utilized to help achieve faster GPS acquisition and more accurate position estimation by RTK. In addition, mapping, navigation, and traffic update are also possible.

The BPS aspects as described above can be extended to single frequency network (SFN) configuration, which is a kind of distributed antenna system that allows multiple geographically separated transmitters to transmit in the same channel/frequency to improve service coverage with the existing frequency resource. Notably, an SFN deployment with three or more transmitters opens up an opportunity for the operator to provide BPS service using only one frequency channel.

Although the service-related information (e.g., video and audio) transmitted from the geographically diverse towers may be the same, the control signals and the physical waveform transmitted from each tower can be different. The difference in waveforms provides an opportunity for a receiver to differentiate signals from each SFN tower and use the TOA information in location calculation. More specifically, the signals transmitted from different transmitters in the same channel/frequency can be differentiated based on timing offset, frequency offset, and/or TDCFS techniques. Notably, the SFN may be deployed based on any one or any combination of the timing offset, the frequency offset, and the TDCFS techniques.

With respect to the timing offset technique, the bootstrap transmit times of SFN transmitters can be staggered so that the bootstrap signals transmitted on the same frequency from different transmitters do not interfere with each other. Thus, a receiver can potentially measure the bootstrap TOA of all the transmitters in the SFN system. Armed with the SFN transmitters' IDs (xmtr_id) and bootstrap timing data (tx_time_offset), which can be sent to the receiver along with the tower locations, a receiver can find out the transmitter locations corresponding to the TOA values and thus compute its location.

With respect to the frequency offset technique, transmitting on the same channel/frequency with a small frequency offset is another technique to mitigate co-channel interference. Just like the timing offset, the frequency offset (tx_carrier_offset) at the transmitter acts as a differentiator of the emitted signal. If the transmitter IDs, carrier offsets, and the transmitter location are made available to the receiver, the receiver can distinguish the TOAs of different transmitters and thus can compute the location. Current ATSC 3.0 standard does not recommend the use of frequency offset for SFN configurations, but the technique can be used if the standard recommends such configuration in the future.

With respect to the TDCFS technique, it is a predistortion technique applied to the data part of a frame excluding the bootstrap and preamble. Signals emitted from each SFN tower can be predistorted using one of the predefined all-pass filters. These TDCFS filters are defied by the num_miso_filt codes and miso_filt_code index parameters in the ATSC Standard, A/324, Scheduler/Studio to Transmitter Link. If the mapping of TDCFS and SFN tower is made available to the receiver, the receiver can figure out which TDCFS is the most likely one for the channel, and hence it can identify the corresponding transmitter. This method, however, is less reliable than other above-mentioned methods, but it can be used as a validation of other methods.

Although the transmitter IDs, timing offsets, frequency offsets, and TDCFS codes should be adequate to identify a transmitter, the receiver can additionally use the intelligence gathered from the neighbor tower measurements to identify the SFN towers. If multiple neighboring TV towers report the bootstrap emission time of a stand-alone or SFN transmitter, a receiver can compute an approximate location of that transmitter using observed time difference of arrival (OTDOA) technique. The receiver can then identify the matching transmitter location mentioned in the neighbor measurement report and associate a TOA with it. This method can also be applied by the receiver to cross-check and validate the integrity of the neighbor measurement reports.

In an embodiment, it is possible to employ a directional antenna at the receiver to help the receiver to effectively scan for different bootstrap signals transmitted from different SFN antennas. Since the SFN towers will be geographically separated, directional antennas at the receiver can help mitigate the co-channel interference while measuring TOAs of the bootstrap signals transmitted on the same frequency. A smart antenna that is capable of beam steering can be effectively used to scan for the different bootstrap signals that impinge on the receiver from different directions.

In an embodiment, it is possible to improve accuracy of a location calculation by taking into consideration a history of neighbor measurement errors. Although the calibration of the transmission chain and the error compensation by the tracking loop will help reduce the error between the actual transmission of the bootstrap and the transmission time reported in the preamble, there will be some residual error which will directly impact the accuracy of the location calculation. One way to mitigate the inaccuracy is to report the previous frame's time reporting error to the receiver. The receiver can apply this correction to the previous set of measurements and compute a more accurate location after receiving the next frame.

As an example, say the transmission time-stamps reported in the preambles of signals from 4 towers have +100 ns, −150 ns, −200 ns, and +250 ns errors. Assume that there is no multipath and that the receiver is able to detect the TOAs within 20 ns accuracy. In this scenario, the time reporting error will introduce location inaccuracies which is much greater than the inaccuracy introduced by the 20 ns TOA uncertainty. Based on the tower geometry and geometric dilution of precision (GDOP), let us say the location error is 180 meters instead of the expected bound of 18 meters. However, if the time reporting error of the previous frame is reported in the next frame after 250 ms, assuming 250 ms frame length, the receiver can recompute the location and achieve 18 meters of accuracy. However, the receiver, in this case, has to wait for the next frame to compute the more accurate location. In this sort of operation, the receiver will be able to compute a less accurate location immediately but will be able to compute a more accurate location for the same set of TOA measurements a frame later.

Although the measurement report is assumed to be delivered via the broadcast chain, the BPS solution as described herein can also work if the measurement report is delivered to the receiver via the Internet. For the internet implementation, the individual towers will send the measurement report to a server. A receiver will retrieve the relevant measurement reports from the server in case the receiver is connected to the Internet. The broadcast plus internet implementation will provide higher yield in location computation. The bootstrap signal, which is used for TOA measurement, is detectable around −12 dB SNR, but the measurement report requires at least −6 dB SNR to be delivered on the broadcast chain. For example, a receiver detects 3 bootstrap TOA values at −7 dB SNR. Since preambles can be detected and decoded around −9 dB SNR, the receiver will also be able to decode the time-stamps of the bootstrap transmission times. However, the receiver will not have the location of the transmitting antennas as the signal that delivers that information will be too weak to decode. Without internet connection, the receiver will be unable to compute a location. However, if the measurement reports are delivered over the Internet, the receiver will be able to compute a location. Further, the broadcast plus internet implementation will be more resilient to spoofing because of the redundancy.

Figure 13:
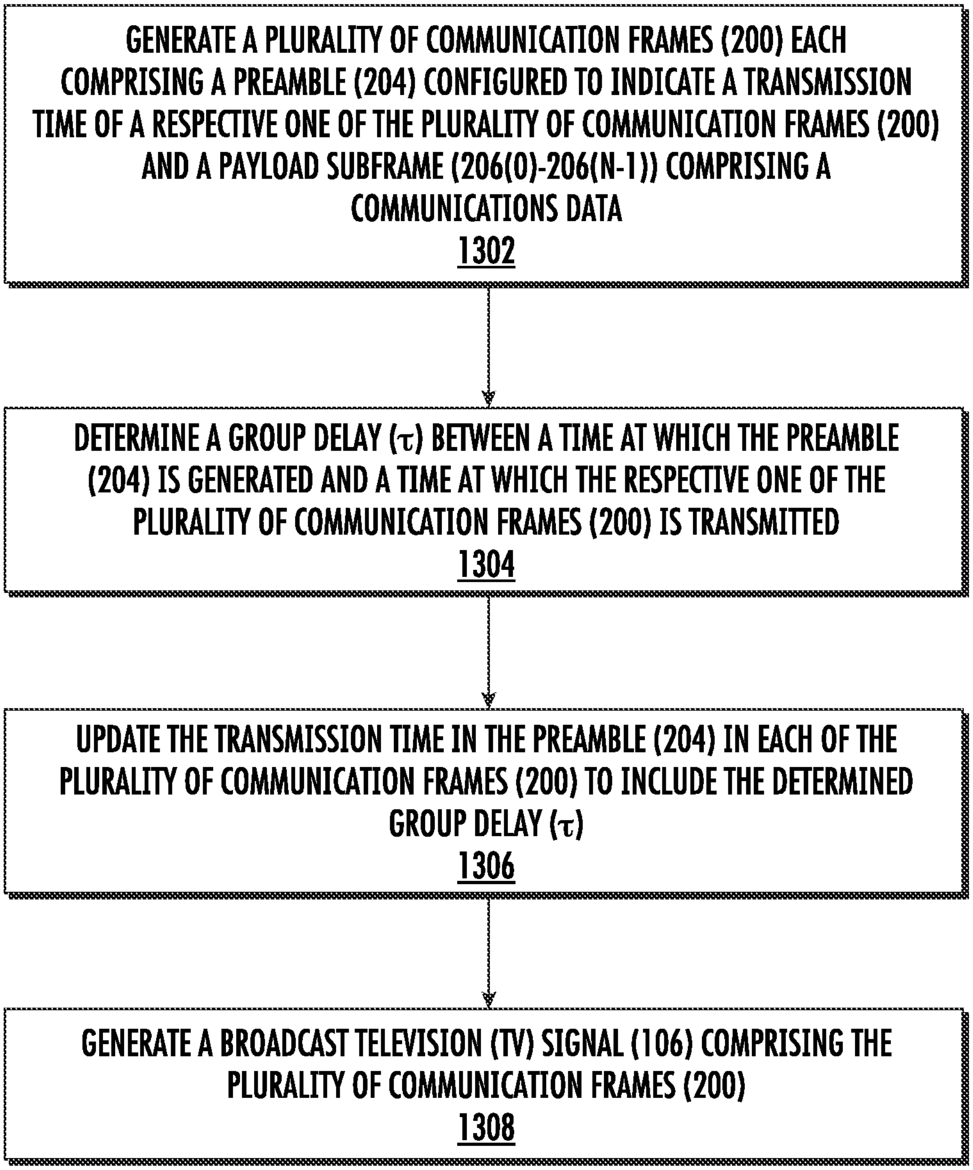
FIG. 13 is a flowchart of an exemplary process that can be performed by the TV signal transmitter in FIG. 1 for supporting broadcast positioning service (BPS)

The TV signal transmitter 102 in FIG. 1 can be configured to support BPS based on a process. In this regard, FIG. 13 is a flowchart of an exemplary process 1300 than can be employed by the TV signal transmitter 102 in FIG. 1 to support BPS according to embodiments of the present disclosure.

The TV signal transmitter 102 is configured to generate a plurality of communication frames each including a preamble configured to indicate a transmission time of a respective one of the plurality of communication frames and a payload subframe that includes a communications data (block 1302). The TV signal transmitter 102 is also configured to determine a group delay (τ) between a time at which the preamble is generated and a time at which the respective one of the plurality of communication frames is transmitted (block 1304). The TV signal transmitter 102 is also configured to update the transmission time in the preamble in each of the plurality of communication frames to include the determined group delay (τ) (block 1306). The TV signal transmitter 102 is further configured to generate a broadcast TV signal including the plurality of communication frames (block 1308).

The TV signal receiver 108 in FIG. 1 can be configured to support BPS based on a process. In this regard, FIG. 14 is a flowchart of an exemplary process 1400 than can be employed by the TV signal receiver 108 in FIG. 1 to support BPS according to embodiments of the present disclosure.

The TV signal receiver 108 is configured to receive a plurality of broadcast TV signals (block 1402). The TV signal receiver 108 is also configured to determine a plurality of propagation delays for the received plurality of broadcast TV signals, respectively (block 1404). Accordingly, the TV signal receiver 108 is further configured to determine a location of the TV signal receiver 108 based on a TDOA of the plurality of broadcast TV signals and the plurality of propagation delays, respectively (block 1406).

FIG. 15 is a block diagram of an exemplary processor-based system 1500 that includes a processor 1502 (e.g., a microprocessor). The processor 1502 that can be included in a TV signal transmitter and/or a TV signal receiver, including TV signal transmitter 104 and/or a TV signal receiver 108 in the broadcast positioning system 100 in FIG. 1 and according to any other embodiments, for respectively generating a transmission time to be included in a transmitted broadcast TV signal to be transmitted, and for receiving and processing the transmission time and/or processing delay information included in a received broadcast TV signal to determine propagation delay of the broadcast TV signal for determining location of the TV signal receiver.

The processor-based system 1500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 1500 includes the processor 1502. The processor 1502 represents one or more processing circuits, such as a microprocessor, central processing unit, or the like. The processor 1502 is configured to execute processing logic in instructions for performing the operations and steps discussed herein. Fetched or prefetched instructions from a memory, such as from a system memory 1510 over a system bus 1512, are stored in an instruction cache 1508. The instruction processing circuit 1504 is configured to process instructions fetched into the instruction cache 1508 and process the instructions for execution. These instructions fetched from the instruction cache 1508 to be processed can include loops that are detected by the loop buffer circuit 1506 for replay based on prediction of one or more loop characteristics as loop characteristic predictions.

The processor 1502 and the system memory 1510 are coupled to the system bus 1512 and can intercouple peripheral devices included in the processor-based system 1500. As is well known, the processor 1502 communicates with these other devices by exchanging address, control, and data information over the system bus 1512. For example, the processor 1502 can communicate bus transaction requests to a memory controller 1514 in the system memory 1510 as an example of a slave device. Although not illustrated in FIG. 15, multiple system buses 1512 could be provided, wherein each system bus constitutes a different fabric. In this example, the memory controller 1514 is configured to provide memory access requests to a memory array 1516 in the system memory 1510. The memory array 1516 is comprised of an array of storage bit cells for storing data. The system memory 1510 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1512. As illustrated in FIG. 15, these devices can include the system memory 1510, one or more input device(s) 1518, one or more output device(s) 1520, a modem 1522, and one or more display controllers 1524, as examples. The input device(s) 1518 can include any type of input device, including, but not limited to, input keys, switches, voice processors, etc. The output device(s) 1520 can include any type of output device, including, but not limited to, audio, video, other visual indicators, etc. The modem 1522 can be any device configured to allow exchange of data to and from a network 1526. The network 1526 can be any type of network, including, but not limited to, a wired or wireless network, a private or public network, a local area network (LAN), a wireless local area network (WLAN), a wide area network (WAN), a BLUETOOTH™ network, and the Internet. The modem 1522 can be configured to support any type of communications protocol desired. The processor 1502 may also be configured to access the display controller(s) 1524 over the system bus 1512 to control information sent to one or more displays 1528. The display(s) 1528 can include any type of display, including, but not limited to, a cathode ray tube (CRT), a liquid crystal display (LCD), a plasma display, etc.

The processor-based system 1500 in FIG. 15 may include a set of instructions 1530 to be executed by the instruction processing circuit 1504 of the processor 1502 for any application desired according to the instructions 1530. The instructions 1530 may include loops as processed by the instruction processing circuit 1504. The instructions 1530 may be stored in the system memory 1510, processor 1502, and/or instruction cache 1508 as examples of a non-transitory computer-readable medium 1532. The instructions 1530 may also reside, completely or at least partially, within the system memory 1510 and/or within the processor 1502 during their execution. The instructions 1530 may further be transmitted or received over the network 1526 via the modem 1522, such that the network 1526 includes the non-transitory computer-readable medium 1532.

While the non-transitory computer-readable medium 1532 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product or software that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as “processing,” “computing,” “determining,” “displaying,” or the like, refer to the action and processes of a computer system, or similar electronic computing device, that manipulates and transforms data and memories represented as physical (electronic) quantities within the computer system’s registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be referenced throughout the above description may be represented by voltages, currents, electromagnetic waves, magnetic fields, or particles, optical fields, or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A television (TV) signal transmitter, comprising:

a frame circuit configured to receive communications data and generate a plurality of communication frames each comprising:

a preamble configured to indicate a transmission time of a respective one of the plurality of communication frames; and a payload subframe comprising the communications data; and a transmitter circuit configured to:

determine a group delay between a time at which the preamble is generated and a time at which the respective one of the plurality of communication frames is transmitted;

update the transmission time in the preamble in each of the plurality of communication frames to include the determined group delay; and generate a broadcast TV signal comprising the plurality of communication frames.

2. The TV signal transmitter of claim 1, wherein the transmitter circuit comprises:

a waveform generation circuit configured to:

insert a bootstrap before the preamble in each of the plurality of communication frames in the broadcast TV signal; and generate a waveform for the broadcast TV signal; and an RF transmitter circuit coupled to an antenna configured to emit the waveform.

3. The TV signal transmitter of claim 2, wherein the transmitter circuit is further configured to determine the group delay between generation of the preamble in each of the plurality of communication frames and emission of the bootstrap in the respective one of the plurality of communication frames.

4. The TV signal transmitter of claim 2, wherein the preamble comprises:

a physical layer (L1) basic signaling field configured to indicate presence or absence of the transmission time and precision of the transmission time; and an L1 detail signal field comprising the transmission time.

5. The TV signal transmitter of claim 4, wherein the transmitter circuit is further configured to update the transmission time in the L1 detail signal field to include the determined group delay between generation of the preamble and transmission of the bootstrap.

6. The TV signal transmitter of claim 1, wherein the transmitter circuit is further configured to determine the group delay based on a measurement performed by a measurement device.

7. The TV signal transmitter of claim 6, wherein the transmitter circuit is further configured to dynamically update the group delay based on a periodic feedback provided by the measurement device.

8. The TV signal transmitter of claim 1, wherein the transmitter circuit is further configured to transmit the broadcast TV signal in accordance with a single frequency network (SFN) configuration.

9. The TV signal transmitter of claim 1, wherein the transmitter circuit is further configured to:

perform neighbor measurements on one or more neighboring TV stations; and transmit the neighbor measurements in the broadcast TV signal to thereby improve resilience and robustness of location and time estimation.

10. The TV signal transmitter of claim 1, wherein the transmitter circuit is further configured to report a time reporting error between the transmission time in the preamble of a current one of the plurality of communication frames and the transmission time reported in the preamble of a preceding one of the plurality of communication frames.

11. The TV signal transmitter of claim 1, wherein each of the plurality of communication frames comprises an Advanced Television Systems Committee (ATSC) communication frame.

12. The TV signal transmitter of claim 1, wherein each of the plurality of communication frames is an Advanced Television Systems Committee (ATSC) 3.0 communication frame.

13. The TV signal transmitter of claim 1, wherein:

the transmitter circuit is further configured to determine Global Positioning System (GPS) enhancement data used by a GPS receiver to acquire one or more GPS satellites; and the transmitter circuit is configured to generate the broadcast TV signal by being configured to generate a broadcast TV signal further comprising the GPS enhancement data.

14. The TV signal transmitter of claim 13, wherein the GPS enhancement data comprises one or more of GPS almanac information and all or part of a Master Frame of a GPS satellite.

15. A method performed by a television (TV) signal transmitter for support broadcast positioning service (BPS), comprising:

generating a plurality of communication frames each comprising:

a preamble configured to indicate a transmission time of a respective one of the plurality of communication frames; and a payload subframe comprising a communications data;

determining a group delay between a time at which the preamble is generated and a time at which the respective one of the plurality of communication frames is transmitted;

updating the transmission time in the preamble in each of the plurality of communication frames to include the determined group delay; and generating a broadcast TV signal comprising the plurality of communication frames.

16. The method of claim 15, further comprising:

inserting a bootstrap before the preamble in each of the plurality of communication frames in the broadcast TV signal;

generating a waveform for the broadcast TV signal; and emitting the waveform.

17. The method of claim 16, further comprising determining the group delay between generation of the preamble in each of the plurality of communication frames and emission of the bootstrap in the respective one of the plurality of communication frames.

18. The method of claim 16, further comprising:

indicating presence or absence of the transmission time and precision of the transmission time in a physical layer (L1) basic signaling field in the preamble; and indicating the transmission time in an L1 detail signal field in the preamble.

19. The method of claim 18, further comprising updating the transmission time in the L1 detail signal field to include the determined group delay between generation of the preamble and transmission of the bootstrap.

20. The method of claim 15, further comprising determining the group delay based on a measurement performed by a measurement device.

21. The method of claim 20, further comprising dynamically updating the group delay based on a periodic feedback provided by the measurement device.

22. The method of claim 15, further comprising transmitting the broadcast TV signal in accordance with a single frequency network (SFN) configuration.

23. The method of claim 15, further comprising:

performing neighbor measurements on one or more neighboring TV stations; and transmitting the neighbor measurements in the broadcast TV signal to thereby improve resilience and robustness of location and time estimation.

24. The method of claim 15, further comprising reporting a time reporting error between the transmission time in the preamble of a current one of the plurality of communication frames and the transmission time reported in the preamble of a preceding one of the plurality of communication frames.

25. The method of claim 15, wherein:

the method further comprises determining Global Positioning System (GPS) enhancement data used by a GPS receiver to acquire one or more GPS satellites; and generating the broadcast TV signal comprises generating a broadcast TV signal further comprising the GPS enhancement data.

26. The method of claim 25, wherein the GPS enhancement data comprises one or more of GPS almanac information and all or part of a Master Frame of a GPS satellite.

27. A non-transitory computer-readable medium, having stored thereon computer-executable instructions that, when executed by a processor device, cause the processor device to:

generate a plurality of communication frames each comprising:

a preamble configured to indicate a transmission time of a respective one of the plurality of communication frames; and a payload subframe comprising a communications data;

determine a group delay between a time at which the preamble is generated and a time at which the respective one of the plurality of communication frames is transmitted;

update the transmission time in the preamble in each of the plurality of communication frames to include the determined group delay; and cause a television (TV) signal transmitter to generate a broadcast TV signal comprising the plurality of communication frames.

28. The non-transitory computer-readable medium of claim 27, wherein the computer-executable instructions further cause the processor device to:

insert a bootstrap before the preamble in each of the plurality of communication frames in the broadcast TV signal;

cause the TV signal transmitter to generate a waveform for the broadcast TV signal; and cause the TV signal transmitter to emit the waveform.

29. The non-transitory computer-readable medium of claim 28, wherein the computer-executable instructions further cause the processor device to determine the group delay between generation of the preamble in each of the plurality of communication frames and emission of the bootstrap in the respective one of the plurality of communication frames.

30. The non-transitory computer-readable medium of claim 28, wherein the computer-executable instructions further cause the processor device to:

indicate presence or absence of the transmission time and precision of the transmission time in a physical layer (L1) basic signaling field in the preamble; and indicate the transmission time in an L1 detail signal field in the preamble.

31. The non-transitory computer-readable medium of claim 30, wherein the computer-executable instructions further cause the processor device to update the transmission time in the L1 detail signal field to include the determined group delay between generation of the preamble and transmission of the bootstrap.

32. The non-transitory computer-readable medium of claim 27, wherein the computer-executable instructions further cause the processor device to determine the group delay based on a measurement performed by a measurement device.

33. The non-transitory computer-readable medium of claim 32, wherein the computer-executable instructions further cause the processor device to dynamically update the group delay based on a periodic feedback provided by the measurement device.

34. The non-transitory computer-readable medium of claim 27, wherein the computer-executable instructions further cause the processor device to cause the TV signal transmitter to transmit the broadcast TV signal in accordance with a single frequency network (SFN) configuration.

35. The non-transitory computer-readable medium of claim 27, wherein the computer-executable instructions further cause the processor device to:

perform neighbor measurements on one or more neighboring TV stations; and cause the TV signal transmitter to transmit the neighbor measurements in the broadcast TV signal to thereby improve resilience and robustness of location and time estimation.

36. The non-transitory computer-readable medium of claim 27, wherein the computer-executable instructions further cause the processor device to report a time report error between the transmission time in the preamble of a current one of the plurality of communication frames and the transmission time reported in the preamble of a preceding one of the plurality of communication frames.

37. The non-transitory computer-readable medium of claim 27, wherein:

the computer-executable instructions further cause the processor device to determine Global Positioning System (GPS) enhancement data used by a GPS receiver to acquire one or more GPS satellites; and the computer-executable instructions cause the processor device to generate the broadcast TV signal by causing the processor device to generate a broadcast TV signal further comprising the GPS enhancement data.

38. The non-transitory computer-readable medium of claim 37, wherein the GPS enhancement data comprises one or more of GPS almanac information and all or part of a Master Frame of a GPS satellite.

* * * * *